United States Patent
Zeine et al.

(10) Patent No.: US 9,620,996 B2
(45) Date of Patent: Apr. 11, 2017

(54) WIRELESS CHARGING WITH MULTIPLE POWER RECEIVING FACILITIES ON A WIRELESS DEVICE

(71) Applicant: Ossia Inc., Redmond, WA (US)

(72) Inventors: Hatem Zeine, Bellevue, WA (US); Anas Alfarra, Bellevue, WA (US); Dale Mayes, Bothell, WA (US); Fady El-Rukby, Redmond, WA (US); Samy Mahmoud, Edmonds, WA (US); John B. Springer, Tucson, AZ (US); Benjamin Todd Renneberg, Lake Tapps, WA (US); Prithvi Shylendra, Bellevue, WA (US); Anthony L. Johnson, Edmonds, WA (US); Douglas Wayne Williams, Bellevue, WA (US)

(73) Assignee: Ossia Inc., Bellevue, WA (US)

( * ) Notice: Subject to any disclaimer, the term of this patent is extended or adjusted under 35 U.S.C. 154(b) by 0 days.

(21) Appl. No.: 15/094,963

(22) Filed: Apr. 8, 2016

(65) Prior Publication Data
US 2016/0301259 A1 Oct. 13, 2016

Related U.S. Application Data

(60) Provisional application No. 62/256,694, filed on Nov. 17, 2015, provisional application No. 62/163,964, (Continued)

(51) Int. Cl.
*H01F 27/42* (2006.01)
*H01F 37/00* (2006.01)
(Continued)

(52) U.S. Cl.
CPC .............. *H02J 50/20* (2016.02); *H02J 7/025* (2013.01)

(58) Field of Classification Search
CPC . H02J 50/20; H02J 7/025; H02J 17/00; H01F 38/14
See application file for complete search history.

(56) References Cited

U.S. PATENT DOCUMENTS 3,989,994 A 11/1976 Brown et al.
4,257,050 A 3/1981 Ploussios et al.
(Continued)

FOREIGN PATENT DOCUMENTS

EP 2160814 A2 3/2010
EP 2609670 A1 7/2013
(Continued)

OTHER PUBLICATIONS

Erictric, "Wireless Charging? Nokia's Newest Prototype Phone Has It," (Jun. 17, 2009) available at http://erictric.com/2009/06/17/wireless-charging-nokias-newest-prototype-phone-has-it/.
(Continued)

*Primary Examiner* — Rexford Barnie
*Assistant Examiner* — Rasem Mourad
(74) *Attorney, Agent, or Firm* — Setter Roche LLP

(57) ABSTRACT

The disclosed system utilizes multiple wireless power receivers (antennas and or paths) for receiving power. The disclosed system includes a chip, such as an application specific chip (ASICs) connectable to multiple antennas and units to convert radio frequency (RF) power into direct current (DC) power. The disclosed system can also include antennas that are used to receiving power, communicate, and send a beacon signal. The disclosed system also comprises a mobile electronic device to receive wireless power using multiple antennas connected or coupled to multiple wireless power receivers.

20 Claims, 15 Drawing Sheets

Related U.S. Application Data filed on May 19, 2015, provisional application No. 62/146,233, filed on Apr. 10, 2015.

(51) Int. Cl.
  *H01F 38/00* (2006.01)
  *H02J 50/20* (2016.01)
  *H02J 7/02* (2016.01)

(56) References Cited

U.S. PATENT DOCUMENTS

| | | |
|---|---|---|
| 4,361,892 A | 11/1982 | Martin et al. |
| 4,685,047 A | 8/1987 | Phillips et al. |
| 4,779,097 A | 10/1988 | Morchin |
| 5,000,037 A | 3/1991 | Baresh et al. |
| 5,218,374 A | 6/1993 | Koert et al. |
| 5,223,781 A | 6/1993 | Criswell et al. |
| 5,400,037 A | 3/1995 | East et al. |
| 5,486,833 A | 1/1996 | Barrett et al. |
| 5,503,350 A | 4/1996 | Foote |
| 5,733,313 A | 3/1998 | Barreras, Sr. et al. |
| 6,114,834 A | 9/2000 | Parise et al. |
| 6,127,799 A | 10/2000 | Krishnan |
| 6,474,341 B1 | 11/2002 | Hunter et al. |
| 6,615,074 B2 | 9/2003 | Mickle et al. |
| 6,621,470 B1 | 9/2003 | Boeringer et al. |
| 6,690,324 B2 | 2/2004 | Vail et al. |
| 6,700,538 B1 | 3/2004 | Richards et al. |
| 6,721,159 B2 | 4/2004 | Takashige et al. |
| 6,738,017 B2 | 5/2004 | Jacomb-Hood et al. |
| 6,856,291 B2 | 2/2005 | Mickle et al. |
| 6,882,128 B1 | 4/2005 | Rahmel et al. |
| 6,967,462 B1 | 11/2005 | Landis et al. |
| 7,068,991 B2 | 6/2006 | Parise et al. |
| 7,084,605 B2 | 8/2006 | Mickle et al. |
| 7,744,032 B2 | 6/2010 | Quinn et al. |
| 8,159,364 B2 | 4/2012 | Zeine |
| 8,410,953 B2 | 4/2013 | Zeine |
| 8,446,248 B2 | 5/2013 | Zeine et al. |
| 8,558,661 B2 | 10/2013 | Zeine |
| 8,854,176 B2 | 10/2014 | Zeine |
| 9,142,973 B2 | 9/2015 | Zeine et al. |
| 2002/0057219 A1 | 5/2002 | Obayashi et al. |
| 2004/0140929 A1 | 7/2004 | Toda et al. |
| 2006/0224489 A1 | 10/2006 | Pantelis et al. |
| 2007/0142061 A1 | 6/2007 | Taubenheim et al. |
| 2008/0014897 A1 | 1/2008 | Cook et al. |
| 2008/0042847 A1 | 2/2008 | Hollister et al. |
| 2008/0122297 A1 | 5/2008 | Arai |
| 2008/0227478 A1 | 9/2008 | Greene et al. |
| 2009/0284220 A1 | 11/2009 | Toncich et al. |
| 2010/0033021 A1* | 2/2010 | Bennett .................. H02J 17/00 307/104 |
| 2010/0133920 A1 | 6/2010 | Joannopoulos et al. |
| 2010/0142509 A1* | 6/2010 | Zhu ..................... H04B 1/1607 370/343 |
| 2010/0222010 A1* | 9/2010 | Ozaki ..................... H02J 5/005 455/77 |
| 2010/0315045 A1* | 12/2010 | Zeine ..................... H02J 7/025 320/137 |
| 2011/0156640 A1* | 6/2011 | Moshfeghi .............. H02J 7/025 320/108 |
| 2011/0225073 A1 | 9/2011 | Won et al. |
| 2012/0176227 A1 | 7/2012 | Nikitin et al. |
| 2012/0220350 A1 | 8/2012 | Wu et al. |
| 2014/0004912 A1* | 1/2014 | Rajakarunanayake ..................... H04W 52/265 455/573 |
| 2014/0009108 A1 | 1/2014 | Leabman |
| 2014/0171107 A1 | 6/2014 | Kao et al. |
| 2014/0266034 A1 | 9/2014 | Lee et al. |
| 2015/0038079 A1* | 2/2015 | Kwon .................. H04B 5/0081 455/41.1 |
| 2015/0042526 A1 | 2/2015 | Zeine |
| 2015/0380973 A1* | 12/2015 | Scheb ..................... H02J 7/025 320/108 |
| 2016/0013685 A1 | 1/2016 | Zeine et al. |
| 2016/0033254 A1 | 2/2016 | Zeine et al. |
| 2016/0099757 A1* | 4/2016 | Leabman .............. H04B 5/0037 307/104 |

FOREIGN PATENT DOCUMENTS

| | | |
|---|---|---|
| JP | 07236204 A | 9/1995 |
| JP | 08037743 A | 2/1996 |
| JP | 08103039 A | 4/1996 |
| JP | 08130840 A | 5/1996 |
| JP | 2002084685 A | 3/2002 |
| JP | 2002152995 A | 5/2002 |
| JP | 2004229427 A | 8/2004 |
| JP | 2005261187 A | 9/2005 |
| JP | 2007022382 A | 2/2007 |
| JP | 2015-050719 | 3/2015 |
| KR | 20050096068 A | 10/2005 |
| KR | 100654623 B1 | 12/2006 |
| KR | 20070055086 A | 5/2007 |
| KR | 10-2011-0088100 | 8/2010 |
| WO | 0103438 A2 | 1/2001 |
| WO | 2008156571 A2 | 12/2008 |
| WO | 2012027166 A1 | 3/2012 |
| WO | 2016019362 A1 | 2/2016 |

OTHER PUBLICATIONS

Goldoni, E. et al., "Experimental analysis of RSSI-based indoor localization with IEEE 802.15.4." In: Wireless Conference (EW), 2010 European Lucca: IEEE, Apr. 12-15, 2010, pp. 71-77.

Smart Antennas for Wireless Mobile Communication, http://www.antennasonline.com/ast.sub.--newsletter2.sub.--10-04.htm.

International Searching Authority: Korean Intellectual Property Office, PCT Application No. PCT/US2016/026819, Applicant: Ossia Inc.; International Search Report and Written Opinion, Mailed: Jul. 25, 2016, 11 pages.

International Searching Authority: Korean Intellectual Property Office, PCT Application No. PCT/US2016/026824, Applicant: Ossia Inc., International Search Report and Written Opinion, Mailed: Jul. 22, 2016, 14 pages.

\* cited by examiner

WIRELESS CHARGING WITH MULTIPLE POWER RECEIVING FACILITIES ON A WIRELESS DEVICE

CROSS-REFERENCE TO RELATED APPLICATIONS

This application claims priority to U.S. Provisional Application No. 62/256,694, filed Nov. 17, 2015, titled INTEGRATED CHIPS INCORPORATING TRANSCEIVER COMPONENTS FOR REMOTE WIRELESS POWER DELIVERY AND FOR RECEIVING WIRELESS POWER; and U.S. Provisional Application No. 62/163,964, filed May 19, 2015, titled SYSTEMS AND METHODS FOR WIRELESS CHARGING; and U.S. Provisional Application No. 62/146,233, filed Apr. 10, 2015, titled SYSTEMS AND METHODS FOR WIRELESS CHARGING, all of which are hereby incorporated by reference in their entireties.

This application is related to U.S. application Ser. No. 15/094,952, filed Apr. 8, 2016, titled CALCULATING POWER CONSUMPTION IN WIRELESS POWER DELIVERY SYSTEMS; U.S. application Ser. No. 15/093,868, filed Apr. 8, 2016, titled INFERRING BATTERY STATUS OF AN ELECTRONIC DEVICE IN A WIRELESS POWER DELIVERY; U.S. application Ser. No. 15/094,079, filed Apr. 8, 2016, titled WIRELESS POWER TRANSCEIVERS FOR SUPPLEMENTING WIRELESS POWER DELIVERY AND EXTENDING RANGE; U.S. application Ser. No. 15/093,023, filed Apr. 7, 2016, titled TECHNIQUES FOR STATICALLY TUNING RETRO-DIRECTIVE WIRELESS POWER TRANSMISSION SYSTEMS; U.S. application Ser. No. 15/092,026, filed Apr. 6, 2016, titled ESTABLISHING CONNECTIONS WITH CHARGERS IN MULTI-CHARGER WIRELESS POWER DELIVERY ENVIRONMENTS; U.S. application Ser. No. 15/091,986, filed Apr. 6, 2016, titled TECHNIQUES FOR DELIVERING RETRODIRECTIVE WIRELESS POWER; U.S. application Ser. No. 15/048,982, filed Feb. 19, 2016, titled WIRELESSLY CHARGEABLE BATTERY APPARATUS; U.S. application Ser. No. 15/048,984, filed Feb. 19, 2016, titled REMOVABLY ATTACHABLE PORTABLE DEVICE APPARATUS WITH INTEGRATED WIRELESS POWER RECEIVING FACILITIES; U.S. application Ser. No. 14/956,673, filed Dec. 2, 2015, titled TECHNIQUES FOR ENCODING BEACON SIGNALS IN WIRELESS POWER DELIVERY ENVIRONMENTS; U.S. application Ser. No. 14/945,741, filed Nov. 19, 2015, titled TECHNIQUES FOR IMAGING WIRELESS POWER DELIVERY ENVIRONMENTS AND TRACKING OBJECTS THEREIN; U.S. application Ser. No. 14/945,783, filed Nov. 19, 2015, titled WIRELESSLY POWERED ELECTRONIC DISPLAY APPARATUSES; U.S. application Ser. No. 14/926,014, filed Oct. 29, 2015, titled TECHNIQUES FOR FILTERING MULTI-COMPONENT SIGNALS, all of which are hereby incorporated by reference in their entireties.

TECHNICAL FIELD

The technology described herein relates generally to the field of wireless communication and power transmission. More specifically, the technology relates to wireless power transfer to a device with multiple wireless power receivers.

BACKGROUND

Many portable electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It would, therefore, be desirable to derive power for a battery charger from EM radiation.

Accordingly, a need exists for technology that overcomes the problem demonstrated above, as well as one that provides additional benefits. The examples provided herein are of some prior or related systems and their associated limitations are intended to be illustrative and not exclusive. Other limitations of existing or prior systems will become apparent to those of skill in the art upon reading the following Detailed Description.

Overall, the examples herein of some prior or related systems and their associated limitations are intended to be illustrative and not exclusive. Other limitations of existing or prior systems will become apparent to those of skill in the art upon reading the following.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
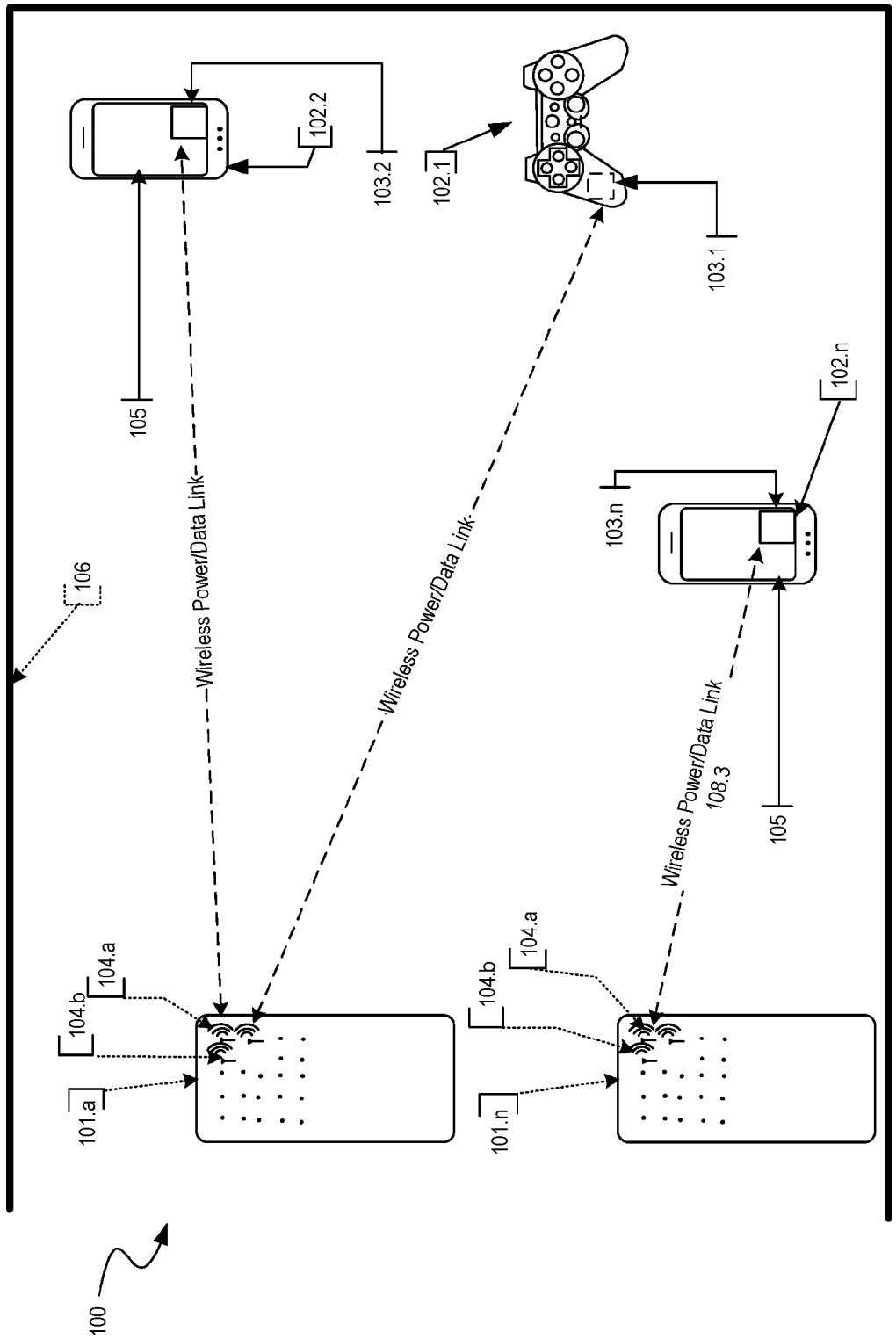
FIG. 1 is a diagram illustrating an example wireless power delivery environment depicting wireless power delivery from one or more wireless transmitters to various wireless devices within the wireless power delivery environment.

The following description and drawings are illustrative and are not to be construed as limiting. Numerous specific details are described to provide a thorough understanding of the disclosure. However, in certain instances, well-known or conventional details are not described in order to avoid obscuring the description. References to "one" or "an" embodiment in the present disclosure can be, but not necessarily are, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, and no special significance is meant when a term is elaborated upon herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of the reader, and in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure describe various techniques for wirelessly charging and/or wireless power delivery from one or more chargers to one or more wireless devices (also referred to herein as "devices" or "target devices") having embedded, attached, and/or integrated power receiver clients (also referred to herein as "wireless power receivers" or "clients").

The techniques described herein utilize wireless technologies to deliver power, data or both. In some embodiments, power, data, or both, may be delivered simultaneously as a continuous complex waveform, as a pulsed waveform, as multiple overlapping waveforms, or combinations or variations thereof. The power and data may be delivered using the same or different wireless technologies.

The wireless technologies described herein may apply to not only electromagnetic (EM) waves, but also to sound waves, and/or other forms of periodic excitations (e.g., phonons). EM waves may include radio waves, microwaves, infrared radiation, visible light, ultraviolet radiation, X-rays, and/or gamma rays. Sound waves may include infrasound waves, acoustic waves, and/or ultrasound waves. The techniques described herein may simultaneously utilize multiple wireless technologies and/or multiple frequency spectrums within a wireless technology to deliver the power, data or both.

The wireless technologies may include dedicated hardware components to deliver power and/or data. The dedicated hardware components may be modified based on the wireless technology, or combination of wireless technologies, being utilized. For example, when applied to sound waves, the system employs microphones and speakers rather than antennas.

System Overview and Architecture

FIG. 1 is a diagram illustrating an example wireless communication/power delivery environment 100 depicting wireless power delivery from one or more wireless transmitters 101 to various wireless devices 102 within the wireless communication/power delivery environment. More specifically, FIG. 1 illustrates an example wireless power delivery environment 100 in which wireless power and/or data can be delivered to available wireless devices 102.1-102.n having one or more power receiver clients 103.1-103.n (also referred to herein as "wireless power receivers" or "wireless power clients"). The wireless power receivers are configured to receive wireless power from one or more wireless transmitters 101.

As shown in the example of FIG. 1, the wireless devices 102.1-102.n are mobile phone devices 102.2 and 102.n, respectively, and a wireless game controller 102.1, although the wireless devices 102.1-102.n can be any (smart or dumb) wireless device or system that needs power and is capable of receiving wireless power via one or more integrated power receiver clients 103.1-103.n. Smart devices are electronic devices that can communicate (e.g., using WiFi) and transmit beacon signals. Dumb devices are electronic device are passive devices that may not communication (e.g., no Bluetooth or Wifi capability) and may not transmit a beacon signal. As discussed herein, the one or more integrated power receiver clients or "wireless power receivers" receive and process power from one or more transmitters/transmitters 101.a-101.n and provide the power to the wireless devices 102.1-102.n for operation thereof.

Each transmitter 101 (also referred to herein as a "charger", "array of antennas" or "antenna array system") can include multiple antennas 104, e.g., an antenna array including hundreds or thousands of spaced-apart antennas, that are each capable of delivering wireless power to wireless devices 102. Each transmitter 101 may also deliver wireless communication signals to wireless devices 102. In some embodiments, the wireless power and wireless communication signals may be delivered as a combined power/communication signal. Indeed, while the detailed description provided herein focuses on wirelessly transmitting power, aspects of the invention are equally applicable to wirelessly transmitting data.

In some embodiments, the antennas are adaptively-phased radio frequency antennas and the transmitter 101 utilizes a novel phase shifting algorithm as described in one or more of U.S. Pat. Nos. 8,558,661, 8,159,364, 8,410,953, 8,446, 248, 8,854,176, U.S. patent application Ser. Nos. 14/461,332 and 14/815,893. The transmitter 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other.

Additionally, the transmitter 101 may include a time delayed retro directive radio frequency (RF) holographic array that delivers wireless RF power that matches the client antenna patterns in three dimensional (3D) space (polarization, shape & power levels of each lobe). It is appreciated that use of the term "array" does not necessarily limit the antenna array to any specific array structure. That is, the antenna array does not need to be structured in a specific "array" form or geometry. Furthermore, as used herein he term "array" or "array system" may be used include related and peripheral circuitry for signal generation, reception and transmission, such as radios, digital logic and modems.

The wireless devices 102 can include one or more power receiver clients 103 (also known as a "wireless power receiver"). As illustrated in the example of FIG. 1, power delivery antennas 104a and data communication antennas 104b are shown. The power delivery antennas 104a are configured to provide delivery of wireless radio frequency power in the wireless power delivery environment. The data communication antennas are configured to send data communications to, and receive data communications from, the power receiver clients 103.1-103.n and/or the wireless devices 102.1-102.n. In some embodiments, the data communication antennas can communicate via Bluetooth™, WiFi, ZigBee™, or other wireless communication protocols.

Each power receiver client 103.1-103.n includes one or more antennas (not shown) for receiving signals from the transmitters 101. Likewise, each transmitter 101.a-101.n includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.n. For example, coherent signals can be determined by computing the complex conjugate of a received beacon signal at each antenna of the array such that the coherent signal is properly phased for the particular power receiver client that transmitted the beacon signal. The beacon signal, which is primarily referred to herein as a continuous waveform, can alternatively or additionally take the form of a modulated signal.

Although not illustrated, each component of the environment, e.g., wireless power receiver, transmitter, etc., can include control and synchronization mechanisms, such as a data communication synchronization module. The transmitters 101.a-101.n are connected to a power source such as, for example, a power outlet or source connecting the transmitters to a standard or primary alternating current (AC) power supply in a building. Alternatively or additionally, one or more of the transmitters 101.a-101.n can be powered by a battery or via other power providing mechanism.

In some embodiments, the power receiver clients 102.1-102.n and/or the transmitters 101.a-101.n utilize or encounter reflective objects 106 such as, for example, walls or other RF reflective obstructions within range to beacon and deliver and/or receive wireless power and/or data within the wireless power delivery environment. The reflective objects 106 can be utilized for multi-directional signal communication regardless of whether a blocking object is in the line of sight between the transmitter and the power receiver client.

As described herein, each wireless device 102.1-102.n can be any system and/or device, and/or any combination of devices/systems that can establish a connection with another device, a server and/or other systems within the example environment 100. In some embodiments, the wireless devices 102.1-102.n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a battery or component coupled to a battery, a PDA etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door locks/handles, electric light switch controllers, electric shavers, etc.

Although not illustrated in the example of FIG. 1, the transmitter 101 and the power receiver clients 103.1-103.n can each include a data communication module for communication via a data channel. Alternatively or additionally, the power receiver clients 103.1-103.n can direct the wireless devices 102.1-102.n to communicate with the transmitter via existing data communications modules.

Figure 2:
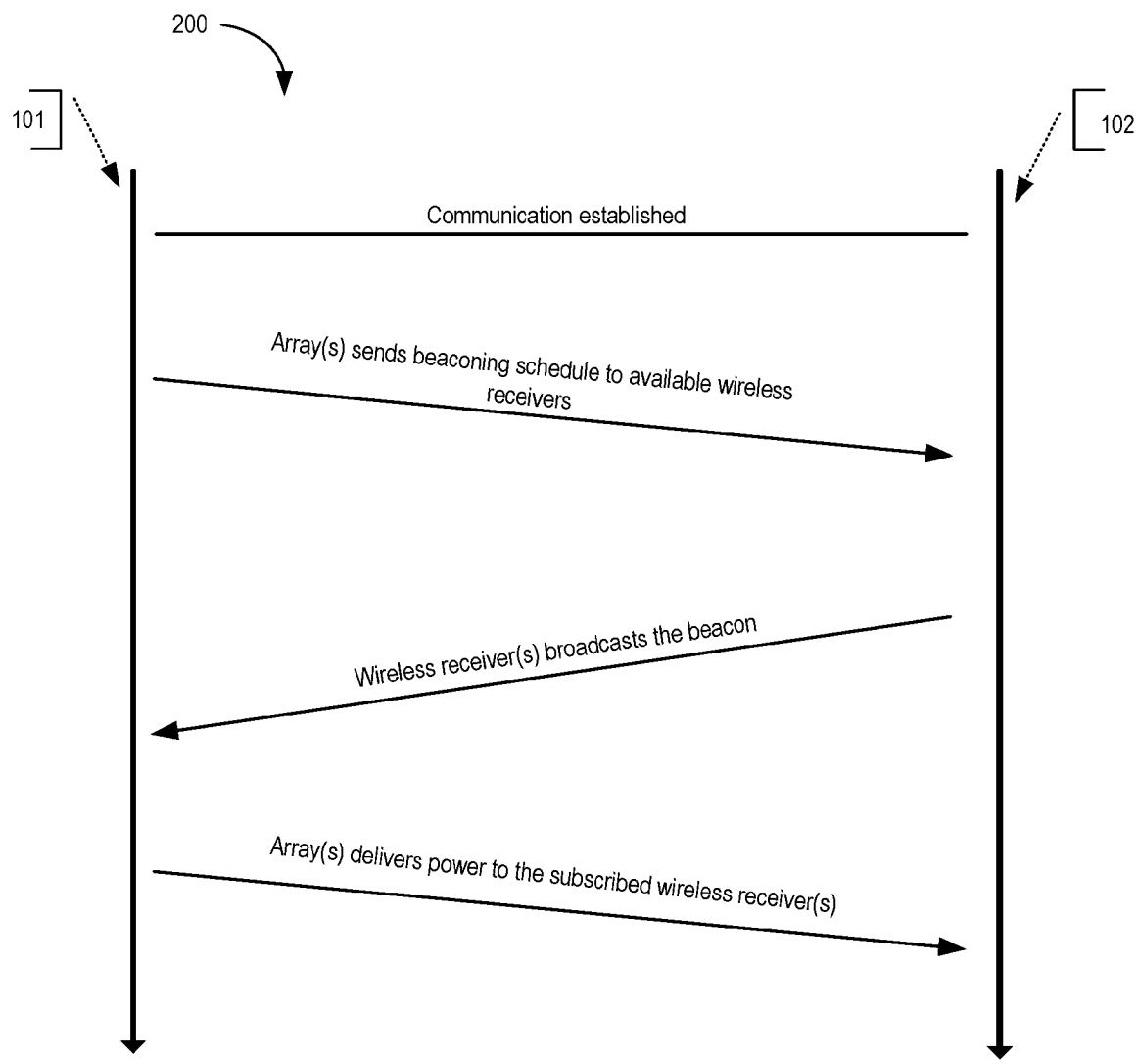
FIG. 2 is a sequence diagram illustrating example operations between a wireless transmitter and a power receiver client for commencing wireless power delivery.

FIG. 2 is a sequence diagram 200 illustrating example operations between a wireless transmitter 101 and a power receiver client 103 for commencing wireless power delivery, according to an embodiment. Initially, communication is established between the transmitter 101 and the power receiver client 103, such as communicate via Bluetooth™, WiFi, ZigBee™, or other wireless communication protocols. The transmitter 101 subsequently sends a beaconing schedule to the power receiver client 103 to arrange beacon broadcasting and RF power/data delivery schedules with this and any other power receiver clients. Based on the schedule, the power receiver client 103 broadcasts the beacon. As shown, the transmitter 101 receives the beacon from the power receiver client 103 and detects the phase (or direction) at which the beacon signal was received. The transmitter 101 then delivers wireless power and/or data to the power receiver client 103 based the phase (or direction) of the received beacon. That is, the transmitter 101 determines the complex conjugate of the phase and uses the complex conjugate to deliver power to the power receiver client 103 in the same direction in which the beacon signal was received from the power receiver client 103.

In some embodiments, the transmitter 101 includes many antennas; one or more of which are used to deliver power to the power receiver client 103. The transmitter 101 can detect phases of the beacon signals that are received at each antenna. The large number of antennas may result in different beacon signals being received at each antenna of the transmitter 101. The transmitter may then utilize the algorithm or process described in one or more of U.S. Pat. Nos. 8,558,661, 8,159,364, 8,410,953, 8,446,248, 8,854,176, and U.S. Provisional Patent Application Nos. 62/146,233 and 62/163,964. The algorithm or process determines how to emit signals from one or more antennas that takes into account the effects of the large number of antennas in the transmitter 101. In other words, the algorithm determines how to emit signals from one or more antennas in such a way as to create an aggregate signal from the transmitter 101 that approximately recreates the waveform of the beacon, but in the opposite direction.

Figure 3:
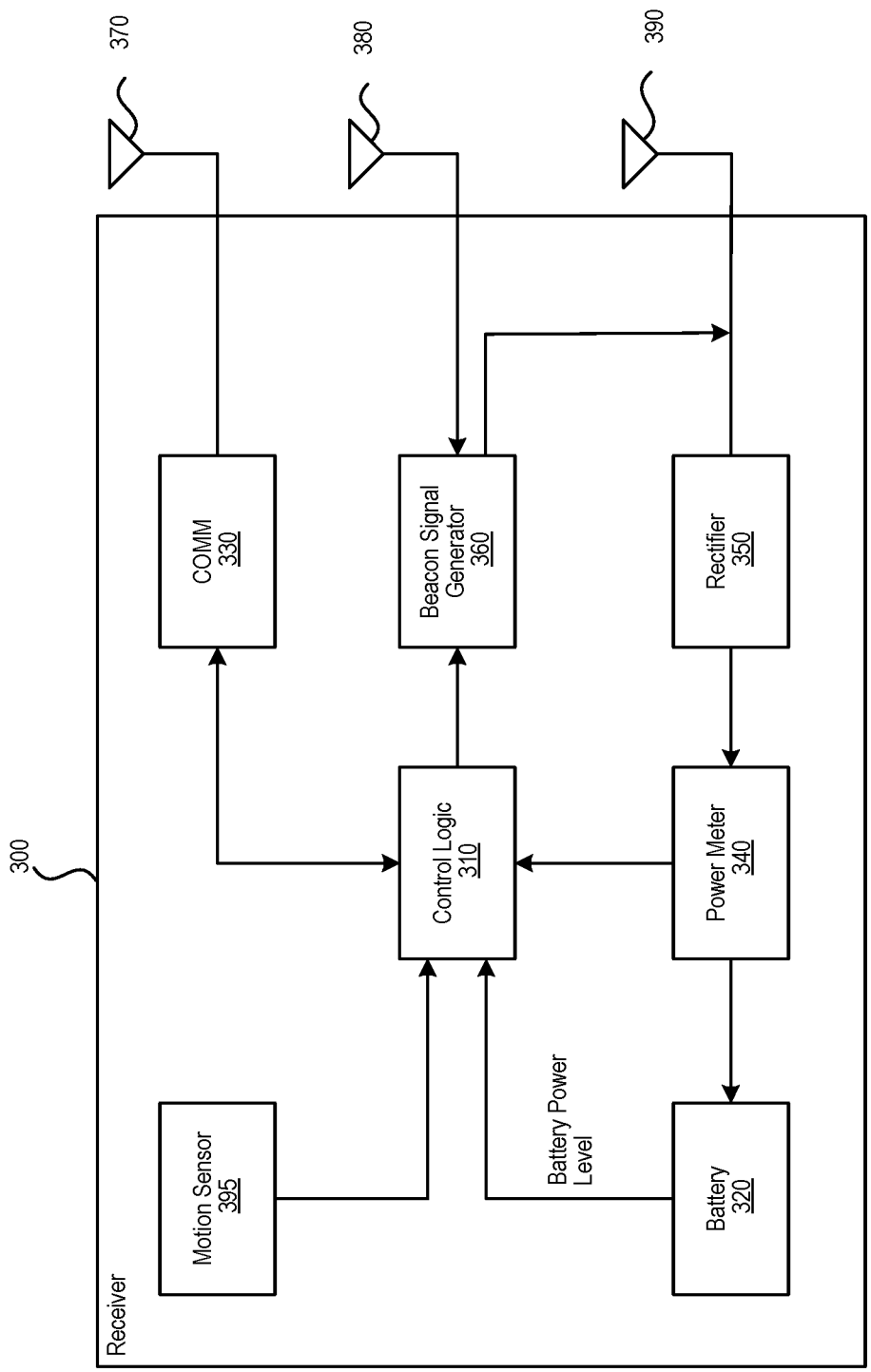
FIG. 3 is a block diagram illustrating an example wireless power receiver (client) in accordance with an embodiment.

FIG. 3 is a block diagram illustrating an example receiver 300 in accordance with an embodiment. The receiver 300 includes various components including control logic 310, battery 320, communication block 330 and associated antenna 370, power meter 340, rectifier 350, beacon signal generator 360 and an associated antenna 380, and switch 365 connecting the rectifier 350 or the beacon signal generator 360 to an associated antenna 390. Some or all of the components can be omitted in some embodiments. Additional or fewer components are also possible.

The rectifier 350 receives (via one or more client antennas) the power transmission signal from the power transmitter, which is fed through the power meter 340 to the battery 320 for charging. The power meter 340 measures the total received power signal strength and provides the control logic 310 with this measurement. The control logic 310 also may receive the battery power level from the battery 320 itself or receive battery power data from, e.g. an API of an operating system running on the receiver 300. The control logic 310 may also transmit/receive via the communication block 330 a data signal on a data carrier frequency, such as the base signal clock for clock synchronization. The beacon signal generator 360 transmits the beacon signal, or calibration signal, using either the antenna 380 or 390. It may be noted that, although the battery 320 is shown for being charged and for providing power to the receiver 300, the receiver may also receive its power directly from the rectifier 350. This may be in addition to the rectifier 350 providing charging current to the battery 320, or in lieu of providing charging. Also, it may be noted that the use of multiple antennas is one example of implementation and the structure may be reduced to one shared antenna, where the receiver multiplexes signal reception/transmission.

An optional motion sensor 395 detects motion and signals the control logic 310. For example, when a device is receiving power at high frequencies above 500 MHz, its location may become a hotspot of (incoming) radiation. So when the device is on a person, the level of radiation may exceed a regulation or exceed acceptable radiation levels set by medical/industrial authorities. To avoid any over-radiation issue, the device may integrate motion detection mechanisms such as accelerometers, assisted GPS, or other mechanisms. Once the device detects that it is in motion, the disclosed system assumes that it is being handled by a user, and signals the power transmitting array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

Figure 4:
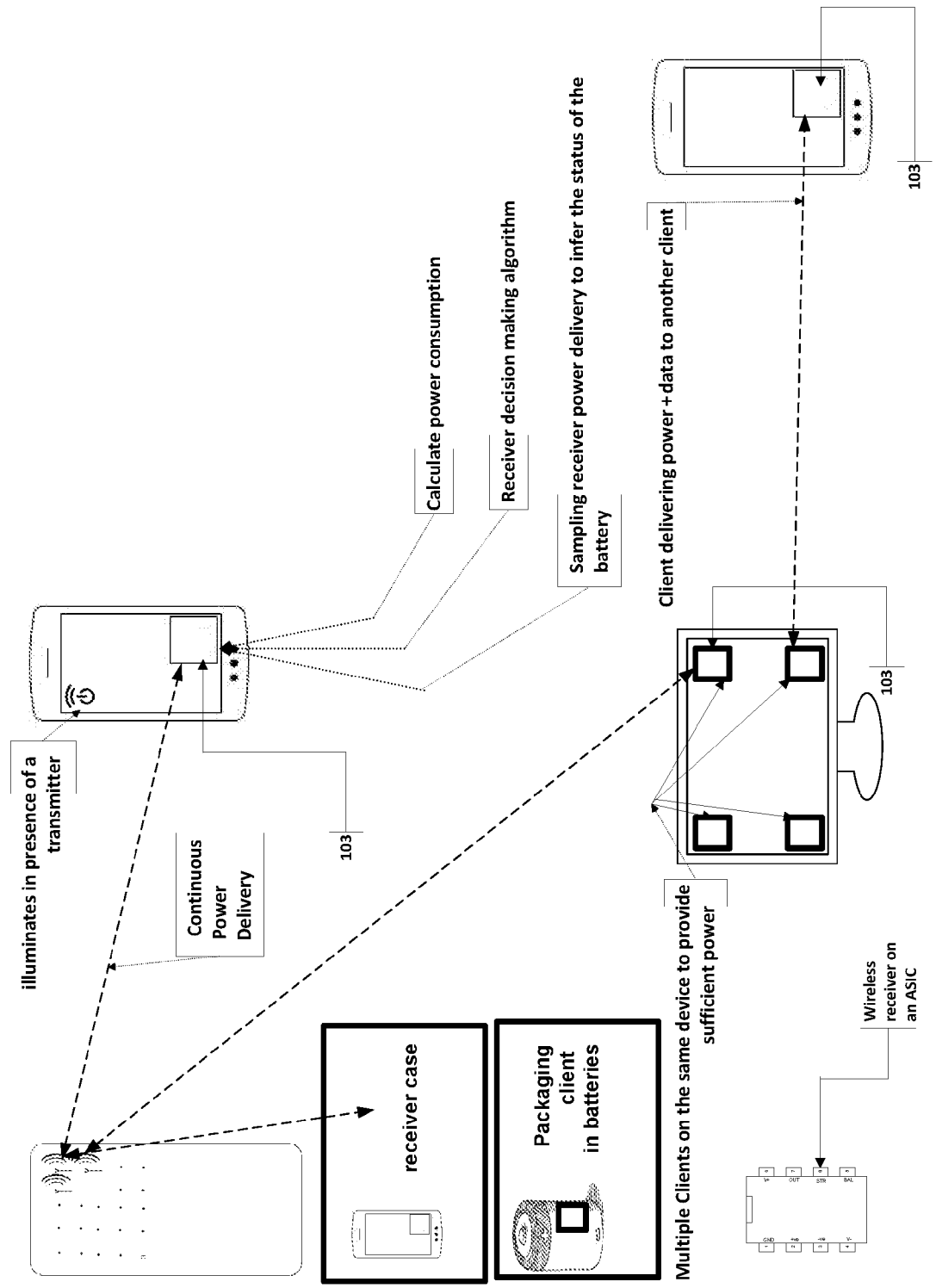
FIG. 4 is a system overview diagram illustrating various components of the various embodiments described herein.

FIG. 4 is a system overview diagram illustrating various embodiments and components possible, though other combinations and variations are possible. As shown, among other features, in some embodiments, the wireless power receiver can be in a form of an application specific integrated circuit (ASIC) chip, a mobile phone case, in a display device (e.g. computer monitor or television, which in turn may relay power to a nearby receiver 103), packaged within a standard battery form factor (e.g. AA battery), etc.

Multiple Power Receiving Facilities on a Wireless Device

In a wireless power system, a wireless device typically has a single wireless power receiver with a single antenna for receiving power. An example wireless power receiver is shown in FIG. 3. In FIG. 3, antenna 390 receives wireless power and rectifier 350 rectifies the received RF power to direct current (DC), and then the DC power is integrated into the wireless device battery.

A wireless device with a single wireless power receiver and single antenna is limited in receiving power. For example, the current power per receiver for the wireless power system described in FIG. 3 is approximately 1 watt RF received at each receiver antenna. However, the wireless device battery actually receives less than 1 watt of power after conversion from RF to DC. One solution to achieve greater power transfer is to deliver more power to the single receiver. Yet, it can be difficult to deliver high levels of wireless power to charge mobile electronic devices while staying within Federal Communication Commission (FCC) limits for RF signals.

In contrast, the disclosed system facilitates receiving wireless power implementing multiple wireless power receivers. The wireless power receivers can have multiple antennas or a single antenna. In some implementations, the system integrates power received at each antenna into the battery of the wireless device. As a sample use of the system, a control unit (e.g., a CPU) facilitates the process of receiving and regulating power from multiple receivers with multiple antennas (or a single antenna).

Alternatively, the system can be configured to power a particular portion of a wireless device with a particular wireless power receiver. The system can have a first wireless power receiver dedicated to powering a processor and a second wireless power receiver dedicated to powering a display. In general, whether the system is designed to use multiple wireless power receivers to charge a battery or use dedicated wireless power receivers to charge a component is a design consideration.

In order for the transmitter to send wireless power to multiple wireless power receivers, the transmitter can use a few, different techniques. One technique assumes that a single client has multiple antennas and the transmitter receives a beacon signal from a single antenna (or from all of the antennas). In other words, the transmitter has one logical or electrical address for each client regardless of the number of wireless power receivers and antennas that the wireless power receiver may have. Alternatively, a transmitter can assume each antenna is an independent client, even if the antenna is on the same wireless power receiver. In this implementation, the client registers with the transmitter multiple times with multiple addresses (e.g., multiple ZigBee™ addresses). The transmitter can then, e.g. schedule to transmit power to each client address independently for multiple beacon signals in a time division or frequency division manner.

In addition to receiving wireless power, the system has wireless power receivers with supplementary functionality. Wireless power receiver antennas can be configured to communicate using a wireless standard (e.g., WiFi, IEEE 802.11, ZigBee™, Bluetooth™) and transmit beacon signals. In some implementations, the system uses wireless power receivers that use an antenna or antennas to communicate via Bluetooth™, WiFi, ZigBee™, or other wireless communication protocols. Also, wireless power receivers can send a beacon signal from one or more of the same power receiving antennas. In general, instructions for communicating or transmitting beacon signals can be stored in memory, and these instructions can be executed by the CPU.

There are several advantages to the disclosed system. One advantage is that a wireless device can receive more wireless power from multiple wireless power receivers as compared to one wireless power receiver with a single antenna. Additionally, a mobile electronic device with multiple receivers and multiple antennas in different locations enables the device to receive electromagnetic (EM) waves with varying properties such as direction, polarity, phase, amplitude, or other properties of EM waves. For example, a mobile device laying on a table may have one wireless receiver with antennas positioned to receive wireless power from above the table and another wireless receiver positioned to receiver wireless power from below the table. Other advantages will become apparent to those having ordinary skill in the art upon reading this detailed description. All advantages may not be present in each implementation of the system.

Figure 5A:
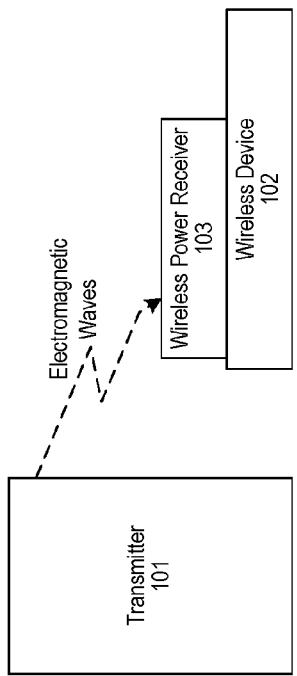
FIGS. 5A-C are diagrams illustrating various examples of a wireless power system delivering power to a wireless device or devices having various numbers of receivers.
Figure 5B:
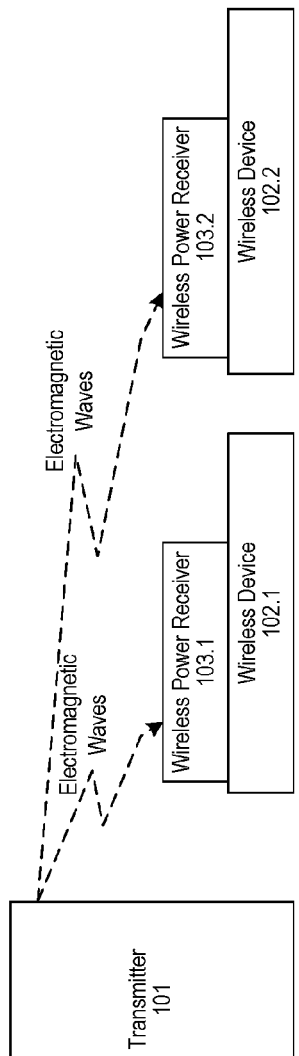
Figure 5C:
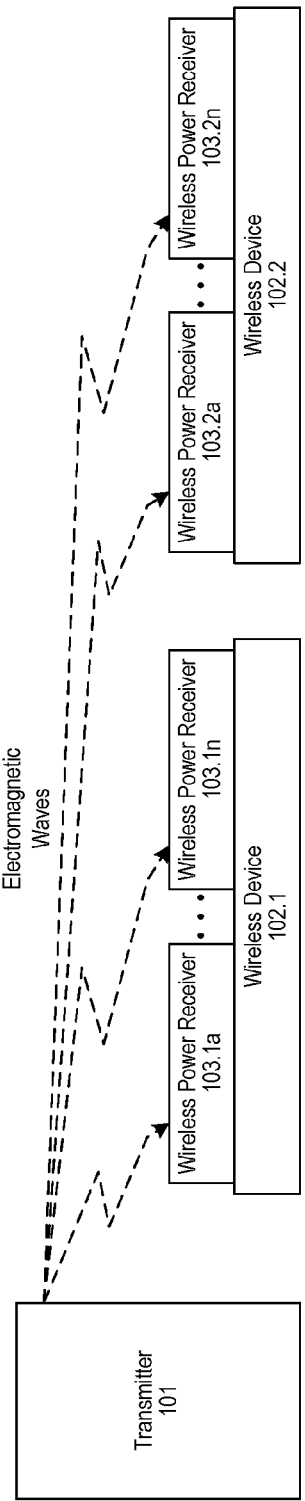

FIGS. 5A-C are diagrams illustrating various examples of a transmitter delivering power to wireless devices having variable numbers of wireless power receivers. As shown in FIG. 5A, a transmitter 101 transmits EM waves to a wireless power receiver 103, which is connected or coupled to a wireless device 102. As described above in FIG. 1, a wireless device 102 can be a mobile phone, laptop, or other mobile electronic device.

In FIG. 5B, a transmitter 101 transmits EM waves to wireless power receiver 103.1, which is connected or coupled to wireless device 102.1, and wireless power receiver 103.2, which is connected or coupled to wireless device 102.2. As described above with respect to FIG. 1, wireless power receivers 103.1 and 103.2 can each have a single antenna for receiving power or have multiple antennas for receiving power. In general, FIG. 5B demonstrates that transmitter 101 is configured to transmit wireless power to multiple devices, and these multiple device may be located in different parts of a space (e.g., one in a corner of a kitchen and the other 10 feet away from the corner).

Importantly, in FIG. 5C, transmitter 101 is configured to transmit EM waves to multiple wireless devices, each with multiple wireless power receivers. As shown in FIG. 5C, wireless devices 102.1 and 102.2 have multiple wireless power receivers 103.1a-1n and 103.2a-2n, respectively. The wireless power receivers 103.1a-1n and 103.2a-2n are coupled or connected to the wireless devices 102.1 and 102.2, respectively. Also, the wireless power receivers are located at different locations on the wireless devices 102.1 and 102.2. Because the wireless receivers are located in different locations, the wireless device can receive EM waves with varying properties. In other words, a transmitter can emit EM waves with various properties (e.g., direction, polarity, frequency, strength, phase), and these waves can be reflected or changed during in the transmission path (e.g., reflection from a wall or object). And because the wireless device has multiple wireless receivers with multiple antennas positioned in different locations it is more likely to receive power than a single wireless receiver with a single antenna. The details of a wireless power receiver 103 are described below in more detail with respect to FIGS. 7A-C and FIGS. 8-11.

Figure 6:
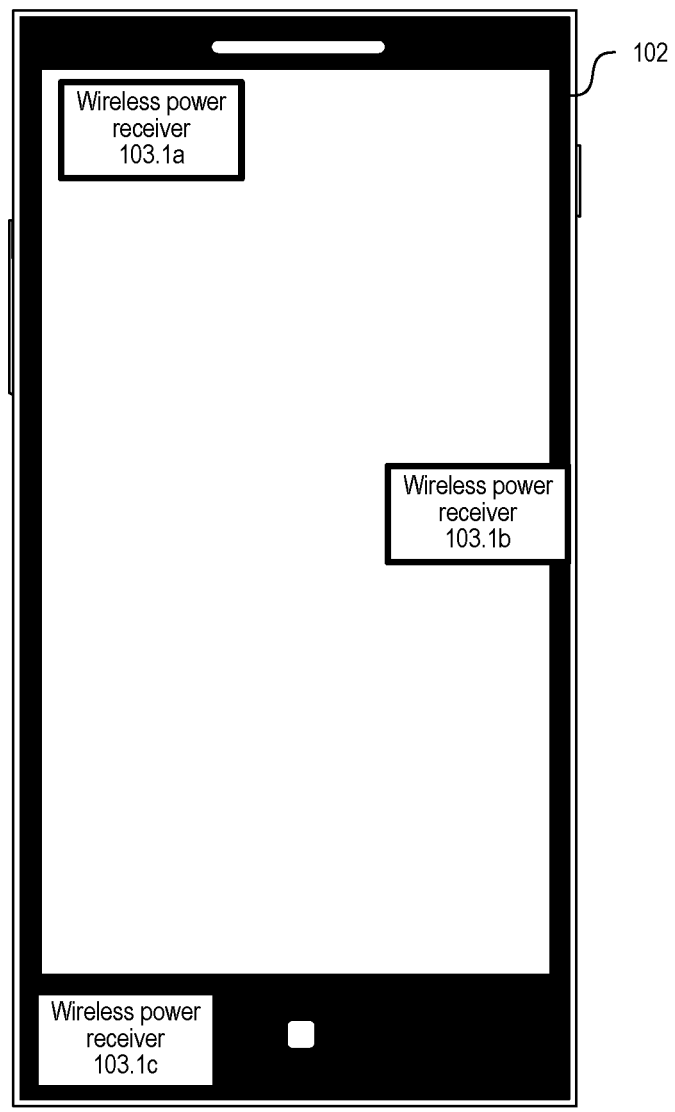
FIG. 6 is an example diagram of a mobile electronic device with multiple wireless receivers.

Building on FIG. 5C, FIG. 6 is an example of a mobile device 102 with multiple wireless power receivers 103.1a-c. In some implementations, the wireless receivers 103.1a-c are spaced at the far corners of the device for various reasons, such as to enable receiving power if some of the antennas in a receiver are blocked. For example, a device set on its back on a thick table may have no path for RF energy to reach an antenna in the middle-back of the device. At least some antennas should receive power in such a condition. In general, the number of wireless power receivers can increase or decrease to optimize the cost and efficiency of the mobile device, depending upon design constraints. For example, depending on the power demands of a mobile device, the mobile device can include more or fewer wireless power receivers. More details regarding the internal components of a wireless power receiver are described below. Each of the examples described below can be integrated into a wireless device to increase the number of wireless receivers.

Figure 7A:
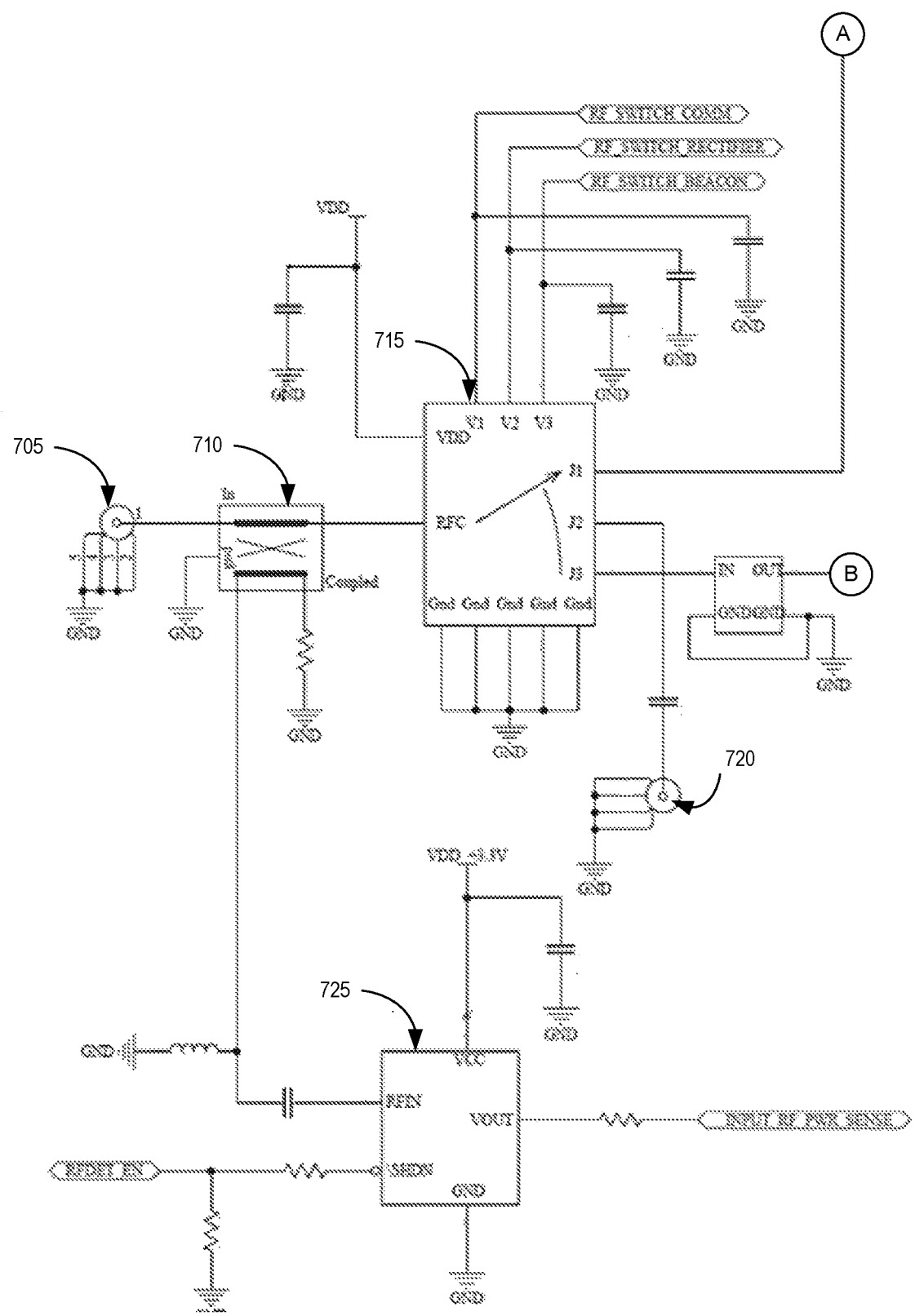
FIGS. 7A-C together are an example schematic diagram of a circuit for a receiver.
Figure 7B:
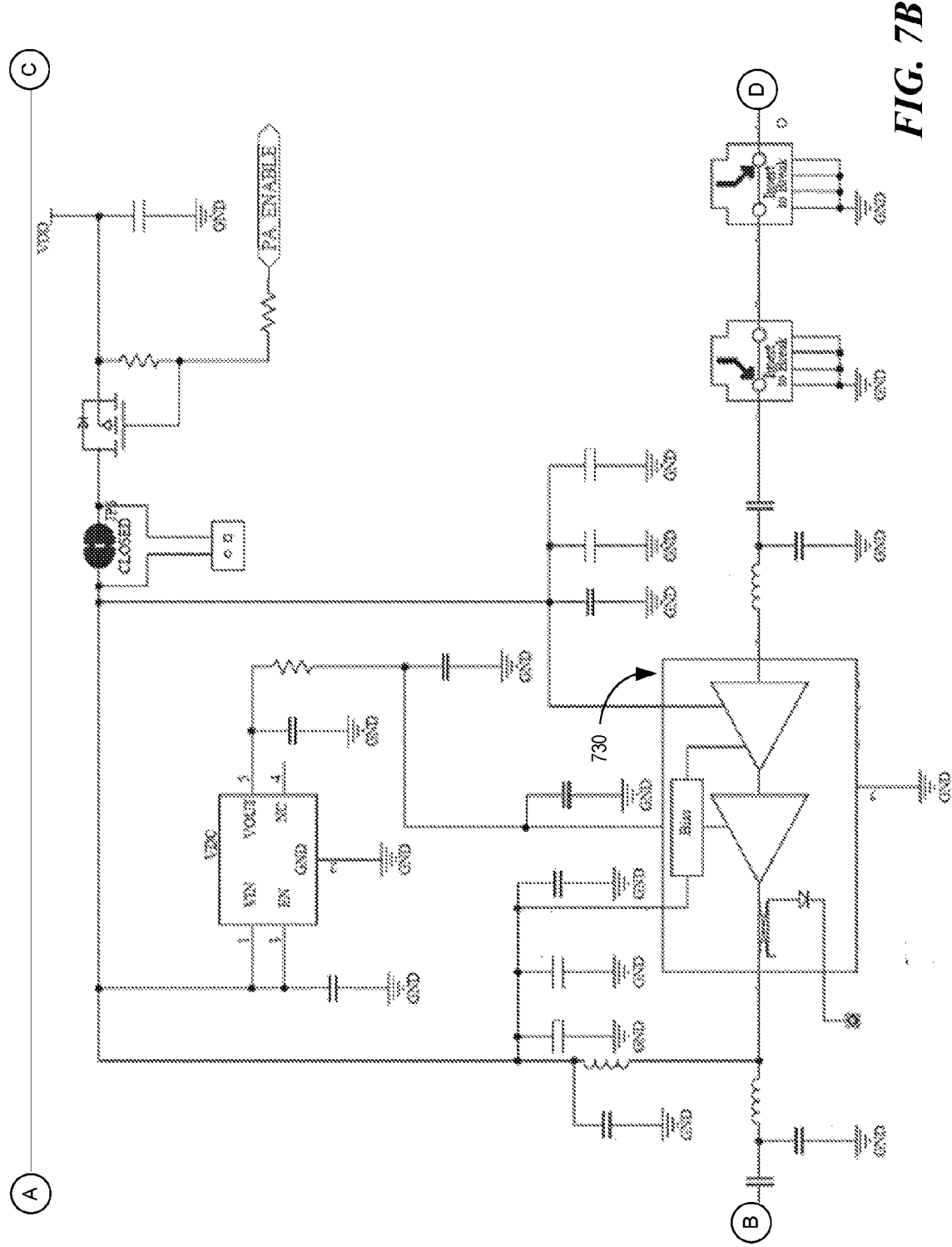
Figure 7C:
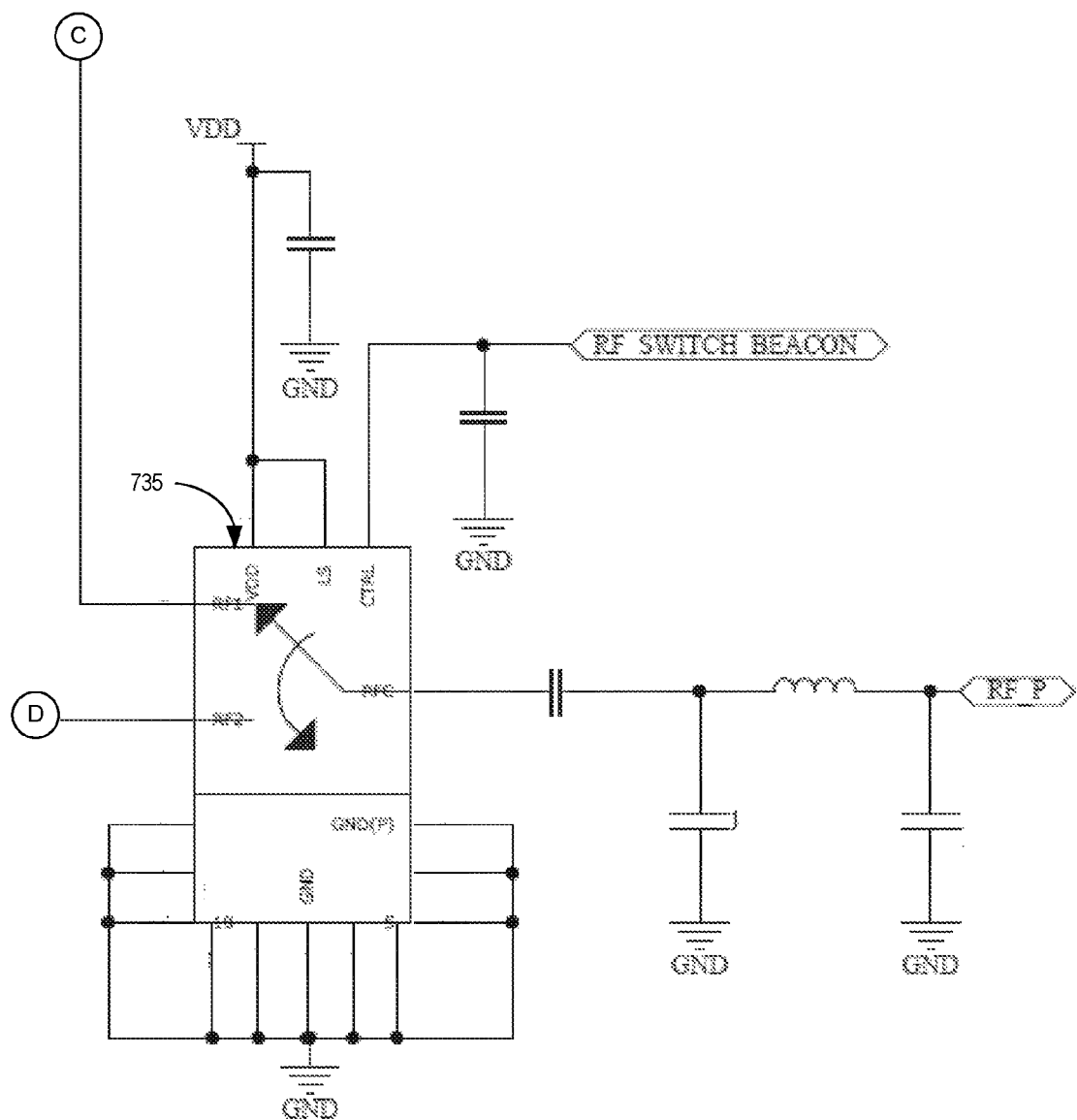

Moving to FIGS. 7A-7C, the Figures together shown an example schematic diagram of a circuit for the wireless power receiver. The schematic diagram is spread over FIGS. 7A, 7B, and 7C as shown with connecting points "A" and "B" in FIG. 7A; "A," "B," "C," and "D" in FIG. 7B; and "C" and "D" in FIG. 7C. As a broad overview, the circuit includes elements such as capacitors, op-amps, inductors, lead wires, and grounds. These components can be varied to meet design specifications. For example, some capacitors can have a capacitance of 1 microfarad or 1 picofarad, and inductors can have inductance of 1 millihenry. Voltages in the circuit can be 0 to 5 volts (or more) with a typical 3.3 volts to open a gate to send a beacon signal. Resistors can have 20 to 200 Ohms (or more) resistance ratings. But overall, actual values of components shown in FIGS. 7A-7C depend upon the implementation details and design constraints.

Starting on the left side of FIG. 7A, an antenna 705 receives wireless power or data. While one antenna is shown in FIG. 7A, several antennas can be included in the circuit, where the antennas would be connected to similar components as the antenna 705. Once the antenna 705 receives power, the wireless power moves to sensing unit 710. Sensing unit 710 senses if an antenna is receiving power. A sensing unit 710 can be a directional coupler or other RF detector (also referred to as a "detection unit"). As shown in FIG. 7A, an input unit 725 is connected or coupled to the sensing unit 710. The input unit 725 may be simple logic or circuitry configured to send information regarding the received wireless power to another part of the system such as the CPU.

Regarding sensing information for wireless power, the sensing unit 710 receives a small portion of the wireless power and notifies the wireless device that power has been received. The CPU in the wireless device can use the sensed wireless power information to determine which antennas are receiving power and how much power is received. In some embodiments, the CPU can store this data in memory and send it to a transmitter, database, or cloud storage device for further analysis (e.g., to determine which antennas are generally better for receiving power). As a sample use of sense information, the transmitter can determine which transmitting antennas are efficiently sending power to which receiving antennas based on sense information, and the transmitter CPU can use this information to optimize the transmission of wireless power.

After sensing that RF power is received at antenna 705, the circuit in FIG. 7A determines a path for the power. As shown in FIG. 7A, switching unit 715 can switch the antenna from a communication or beacon mode to rectifying mode by applying a voltage to the switching unit 715 ("RF_switch_RECTIFIER," "V2"). As V2 is applied to the switching unit 715, the power is directed towards "J2" where it enters an RF rectifier 720. A switching unit 715 can be referred to as a control unit and it can be implemented in an integrated circuit or on an ASIC. The RF rectifier 720 converts the RF power to DC, and the DC power can directly enter a battery. Alternatively, the circuit can further process the power as described in FIGS. 8-10 below.

Also, the circuit in FIGS. 7A-C can use antenna 705 to communicate or send the beacon signal. As shown in FIG. 7A, if a voltage (e.g., V1 by "RF SWITCH COMM") is applied to switching unit 715, the circuit can communicate using a known signal type (e.g., WiFi, Bluetooth™, ZigBee™). The "A" point on FIG. 7A shows where communication signals are transmitted and received. Additionally, if a voltage (e.g., V3) is applied to switching unit 715, the beacon signal can transmitted from antenna 705 as described in more detail below with respect to FIG. 7C.

Moving to FIG. 7B, the circuit can send communication from point "A" to point "C". While not shown in FIG. 7B, point "C" is connected to an integrated circuit for communication such as communicate via Bluetooth™, WiFi, ZigBee™, or other wireless communication protocols. Before the signal is sent to the respective communication chip, a filter can remove the data from the wireless power signal. More details regarding the filter and circuit as described in FIG. 10 below.

Staying with FIG. 7B, a central control unit (e.g., a processor) can send a pulse and amplitude enabling signal ("PA_Enable") to enable a beacon signaling sequence. Once the "CLOSED" portion of circuit 7B opens (as shown in the middle-upper portion of FIG. 7B), a voltage reaches two op-amps 730. The two-op amps 730 amplify the beaconing signal coming from "D". A CPU or ASIC can generate the beacon signal that comes from "D". After the beaconing signal is amplified, antenna 705 transmits it.

As shown in FIG. 7C, another switch 735 can active the beacon signaling path shown in FIG. 7C. A CPU can send a "RF Switch Beacon" signal into switch 735, and switch 735 can flip and cause "RF_P" to enter the circuit. "RF_P" can be a pulse with a beacon signal.

Figure 8:
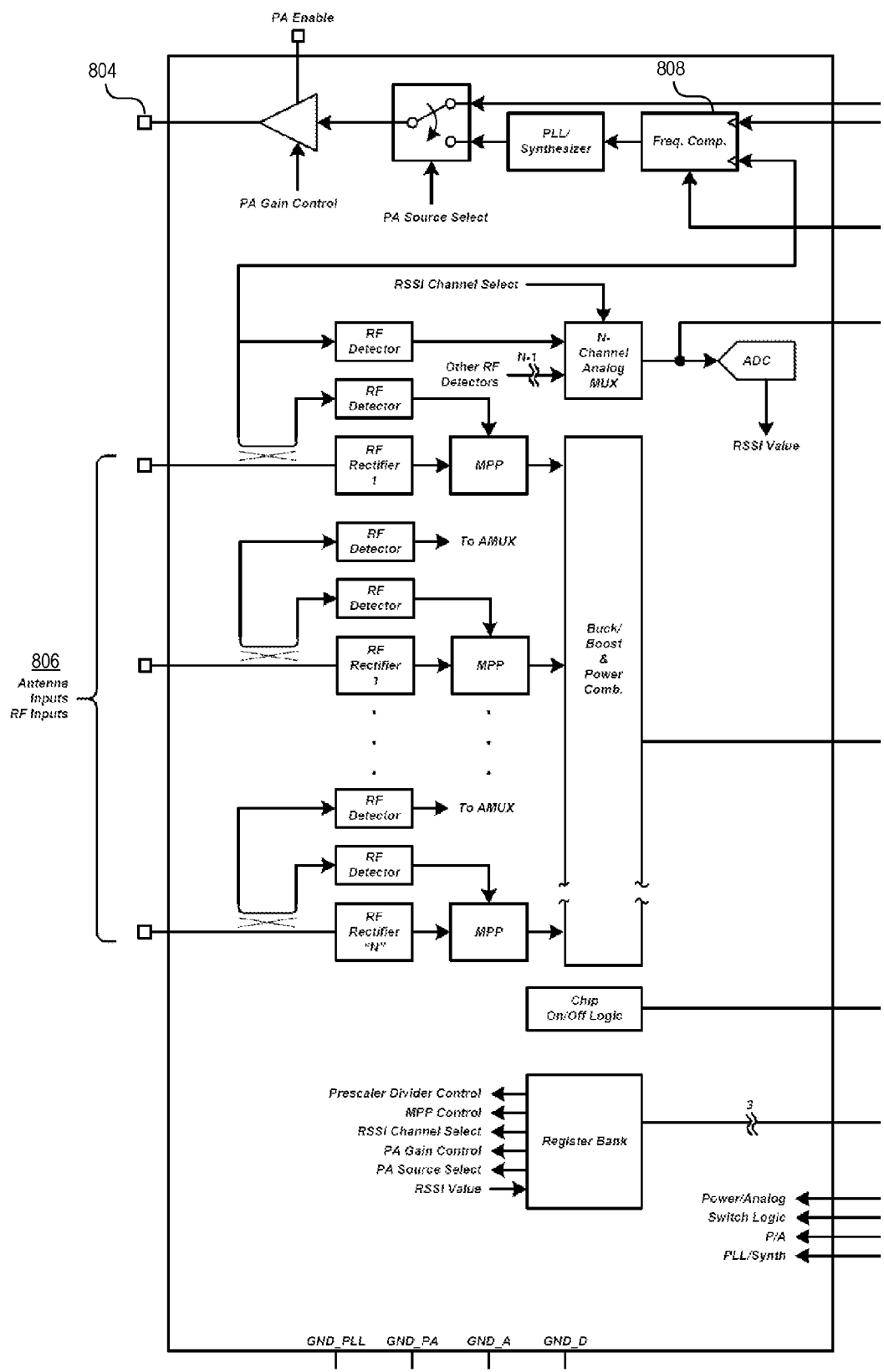
FIG. 8 is an example integrated circuit block diagram with multiple antennas for receiving power.
Figure 9:
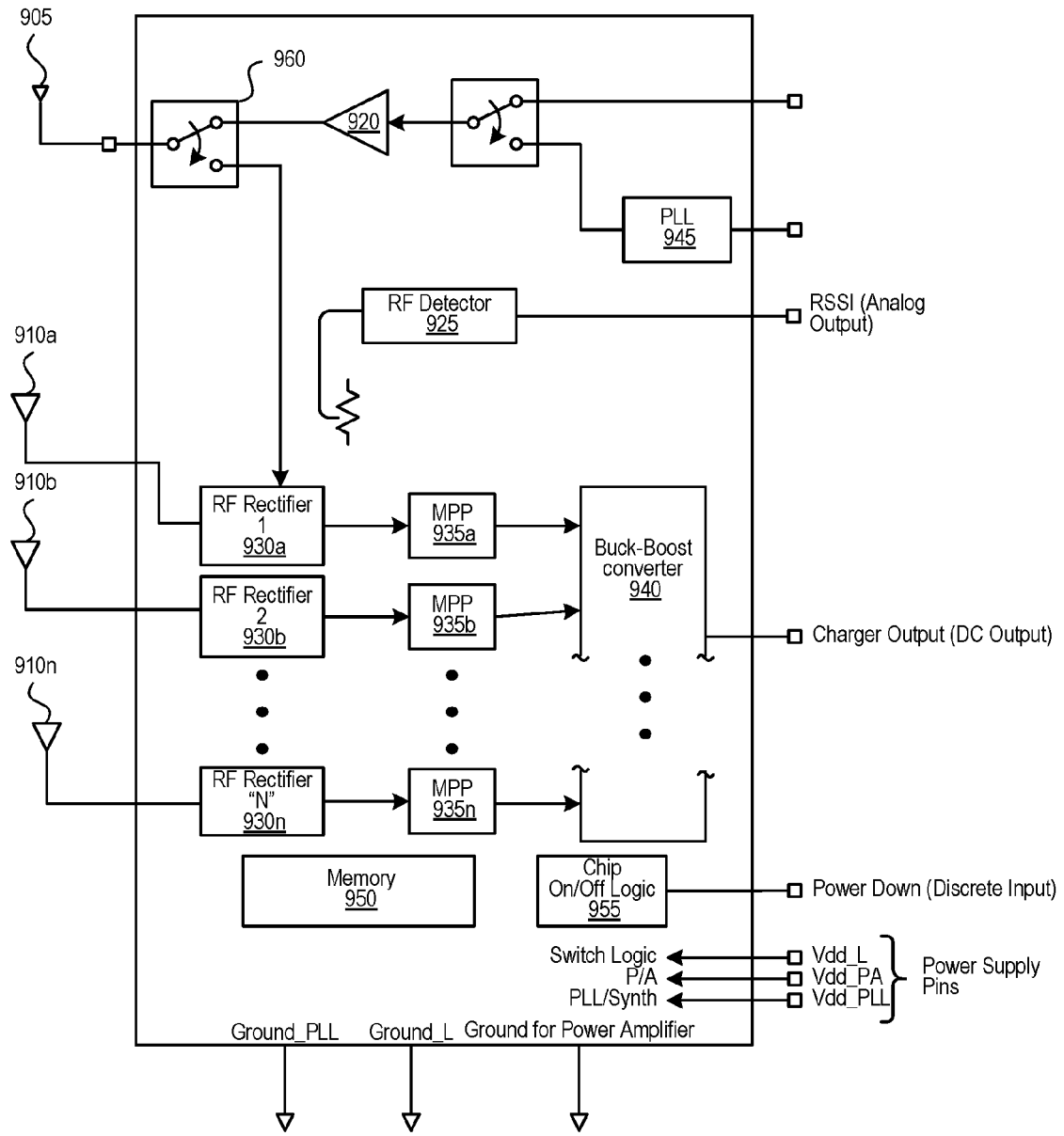
FIG. 9 is another example of an integrated circuit block diagram with multiple antennas for receiving wireless power.
Figure 10:
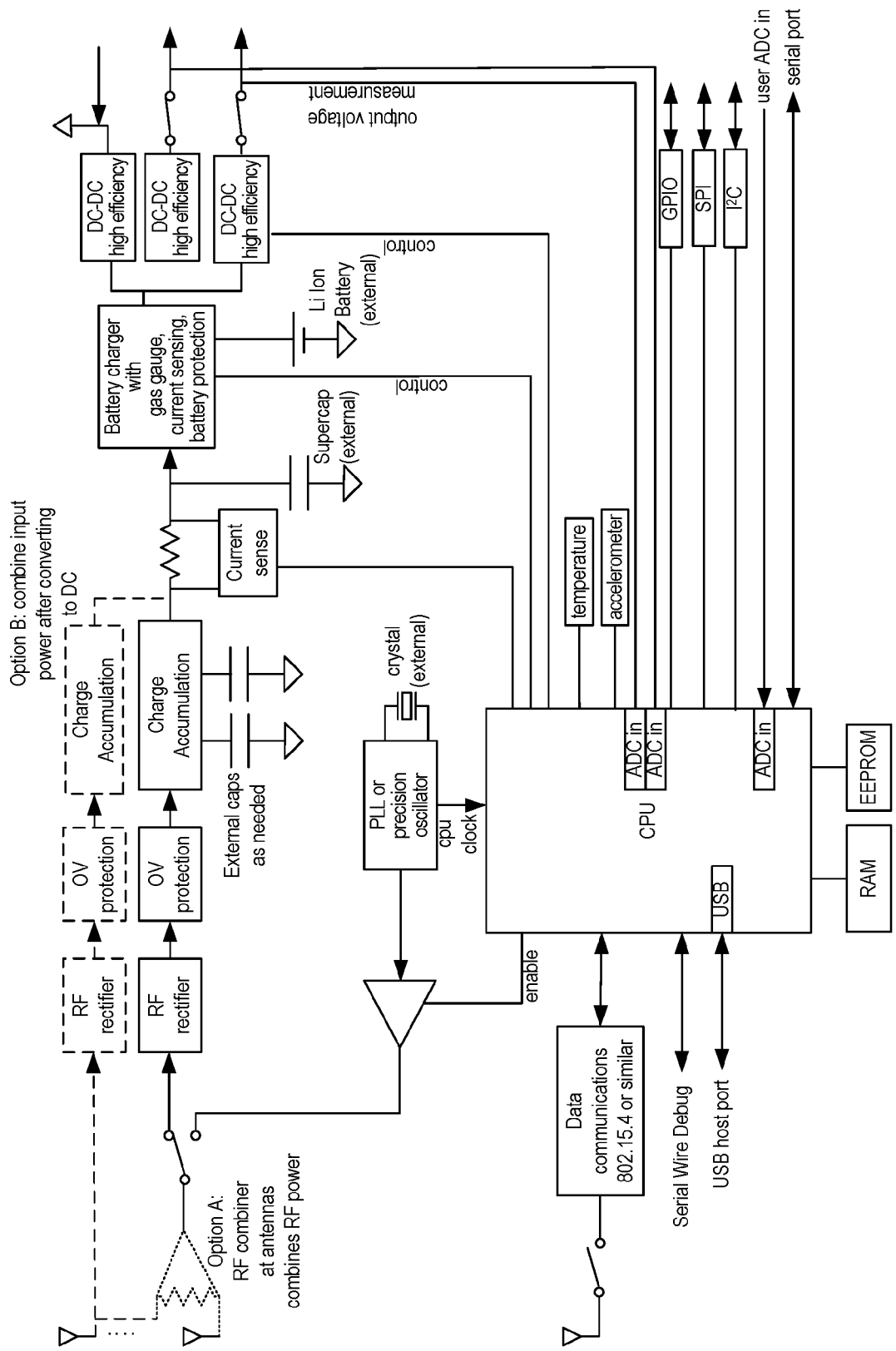
FIG. 10 is an another example of an integrated circuit block diagram connected to central processing unit for data communication.
Figure 11:
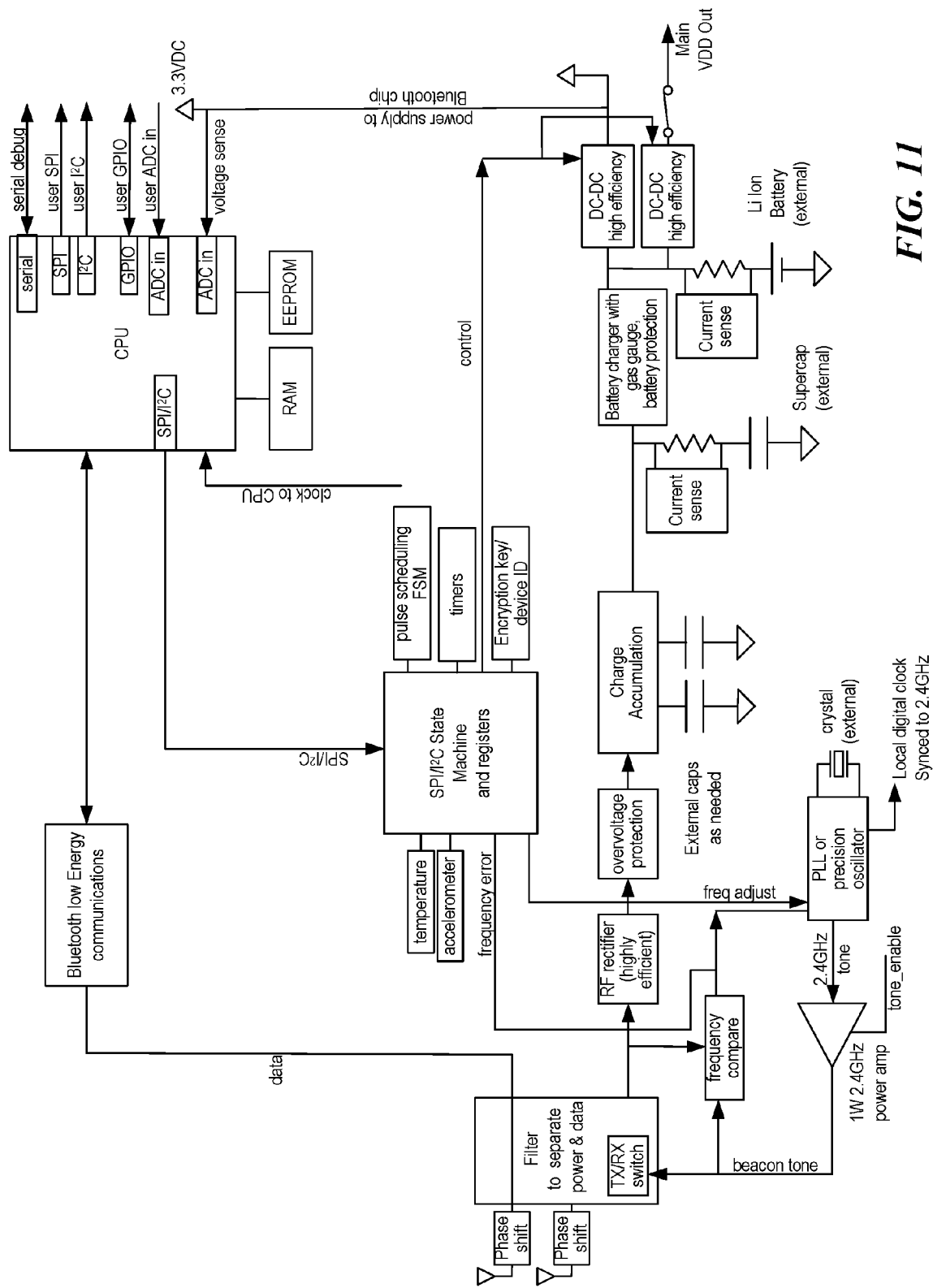
FIG. 11 is an additional example of an integrated circuit block diagram illustrating multiple antennas for receiving power and communicating data.

Overall, FIGS. 7A-7C describe a general integrated circuit schematic for using an antenna to receive power, communicate information, and transmit a beacon signal. As disclosed below, FIGS. 8, 9, and 10 describe specific implementations of the integrated circuit described in FIGS. 7A-7C with various embodiments. Specifically, FIGS. 8 and 9 are block diagrams of an application-specific integrated circuit (ASIC) for receiving wireless power. FIGS. 10 and 11 disclose an ASIC chip that is connected or coupled to a CPU in a wireless device.

FIG. 8 is an example of a block diagram illustrating a wireless power receiver (also known as a "client chip" or "receiver chip"). As shown in FIG. 8, the client chip can include: "N" RF detectors (where "N" is a natural number), "N" RF rectifiers, an MPP (maximum power point tracking "MPPT", also referred to as the "MPP") for each "N" RF rectifier, an N-channel analog multiplexer (MUX), a buck-boost converter, an analog to digital converter (ADC), antenna 804 for sending beacon signals, "N" antenna inputs 806 for receiving wireless power, a register bank, ground connections, a frequency comparer 808, and input/output connections. As illustrated, an RF rectifier can be coupled to an MPP loop to optimize power delivery. For example, the MPPT loop can communicate with a buck-boost converter to provide the client with constant voltage/current in an efficient manner. Additionally, as shown in FIG. 8, one antenna can be transmitting a beacon signal as another antenna concurrently receives RF power. Also, while not shown in FIG. 8, a device can receive a sensed RF value from an RF detector and based on the received RF power being low (e.g., less than 0.02 watts), the device (e.g., using a CPU) can switch the antenna off (e.g., with a switch connected to the antenna).

Also, the client chip receives a strength signal indicator (RSSI, or other similar signal) via the received signal and ADC. The RSSI can serve multiple purposes such as identifying clients that are not receiving enough power to rectify a significant amount of DC, or identifying clients who are receiving a very high power and should probably have their duty cycle reduced. In general, the RF detector, MPP, N-MUX, ADC, and RSSI components communicate with the CPU (not shown) to determine how to optimize power received by the client chip.

While a buck-boost converter is shown in FIG. 8, other converters, such as a flyback converter can be used to optimize the power delivery. Also, while the client chip shows "N" number of antennas, and more antennas generally means the chip can receive more power, the number of antennas may be reduced to lower cost of chip design. Also, to optimize power delivery to the client, short traces can be used and the number of resistors can be limited to lower the loss of power (i.e., improve efficiency). Additionally, antennas should be placed close to RF rectifiers to reduce impedance. Also, if all antennas emit the beacon signal then spacing can vary between antennas because the transmitter can detect the beacon signal from all antennas and send power back to all antennas. Alternatively, if only one antenna emits the beacon, the other antennas should be within ¼ wave length (~3 cm) of the beacon emitting signal.

Also, FIG. 8 includes a register bank. The register bank can store values such as a received RSSI value, MPP value, RSSI channel select, PA gain control, PA source select, and prescaler divider control. These values can be saved in the register can used by a processor. Additionally, a processor can access the register bank and send the stored values to another device or network.

Similar to FIG. 8, FIG. 9 is another example block diagram illustrating a schematic of a similar client chip. The client chip receives, rectifies, and converts RF power into DC voltage/current. A client chip can use the DC voltage/current received from a client chip to power the client, or it can use the DC voltage/current to store power in a battery. Also, a client chip can couple to a single antenna 905 (e.g. to transmit the beacon signal), and couple to multiple antennas 910*a-n* (e.g., four antennas to receive power). The client chip includes an RF rectifier 930*a-n* for each antenna, a maximum power point tracking (MPPT, or also referred to as the "MPP") 935*a-n* loop, a buck-boost converter 940, a transceiver switch 960, an RF detector 925, a PLL 945, and a memory 950. In general, multiple client chips can be placed in a single wireless device as shown in FIG. 6.

In some implementations, the client chip transmits a beacon signal, and the beacon signal includes information used to compute the location of the client, as described above in FIG. 1. The client chip can transmit beacon signaling to the wireless charger (e.g., in wireless charger 101 in FIG. 1) using an RF signal input, PLL 945, power amplifier 920, transceiver switch 960, and antenna 905. The beacon signal encoding process and algorithm may be that described in the applicant's U.S. application Ser. No. 14/956,673, filed Dec. 2, 2015, titled TECHNIQUES FOR ENCODING BEACON SIGNALS IN WIRELESS POWER DELIVERY ENVIRONMENTS, which is hereby incorporated by reference in its entirety.

In some implementations, the memory 950 on the client chip stores the power management policy for the client device (e.g., the power management integrated circuit (PMIC) has been replaced or supplemented with the client chip). In these implementations, the client chip can supply power directly to the client device (e.g., in the battery or into the client's system). Alternatively, a client may have a proprietary PMIC, and the client chip may be coupled to the PMIC. In these implementations, the client chip supplies power according to the specification provided by the manufacturer of the PMIC, and the client's PMIC handles the management of this power (e.g., pins and traces can be used to allow the client chip and PMIC to communicate and transfer power).

While not shown in FIG. 8 or 9, a client chip can support a wide range of applications with different power requirements starting from several hundred milli-watts (mW) up to several watts of power. Also, the client chip can include an on-chip temperature sensor to protect the chip from overheating or damage.

Moving to FIG. 10, FIG. 10 is an example of a power receiving client. As shown in solid lines, RF signals combine right after being received by antennas and then the power is rectified. The efficiency of this alternative can depend on if there is constructive or deconstructive interference when combining RF power after the antennas receive power signals. Another option, as shown with broken lines, RF signals are combined after the power is rectified. The receiver can employ one of two ways to achieve parallel combination: either by combining the signals at RF in the front end of the client or by combining the signals at DC after conversion. FIG. 10 also includes a data communications unit (bottom left), which can be used to communicate with a network or transmitter over WiFi or Bluetooth™.

FIG. 11 is another, similar example of a power receiving client with other client technology. This example is different than the examples above because, in part, this client includes a Bluetooth™ chip. As shown in FIG. 11, the client can have antennas that receive power and data (e.g., Bluetooth™ data). In some implementations, the power and data signals can be at the same frequency, and the antennas of the client may pick up both a power signal and a data signal. In order to separate these signals, as shown in FIG. 11, the client can include a filter to separate power from data even if the signal is the same frequency. After the signal is filtered, power can be sent to the RF rectifier and converted to DC power. Additionally, a client can communicate via Bluetooth™, WiFi, ZigBee™, or other wireless communication protocols In some implementations, a data power filter may be used to separate the signals. Methods and systems for separating or filtering these types of signals is described in the applicant's U.S. application Ser. No. 14/926,014, filed Oct. 29, 2015, titled TECHNIQUES FOR FILTERING MULTI-COMPONENT SIGNALS, which is hereby incorporated by reference in its entirety. Data signals can be sent to the Bluetooth™ chip for appropriate transmission. Similar to other examples of chips and clients described above, this client can use one or more channels in parallel to receive RF power and convert it into DC using the MPPT algorithm for optimization. In some implementations, DC power can be used to charge a battery on the client device. This client is also capable of sending a beacon signal at 2.4 GHz because it has a PLL/Frequency Synthesizer and power amplifier integrated into it, which can be used to send a beacon with the client's location to a wireless charger. The frequency of operation is not limited to just the 2.4 GHz but can also operate in other ISM frequency bands or frequency bands outside of ISM.

Also, while not shown in FIG. 11, WiFi technology can be used in a similar method described in the example above.

For example, if a client has a WiFi chip and a client chip, a filter can be used on the client chip to separate the data signal from the power signal even if the signals are sent at the same frequency.

Example Computer Systems

Figure 12:
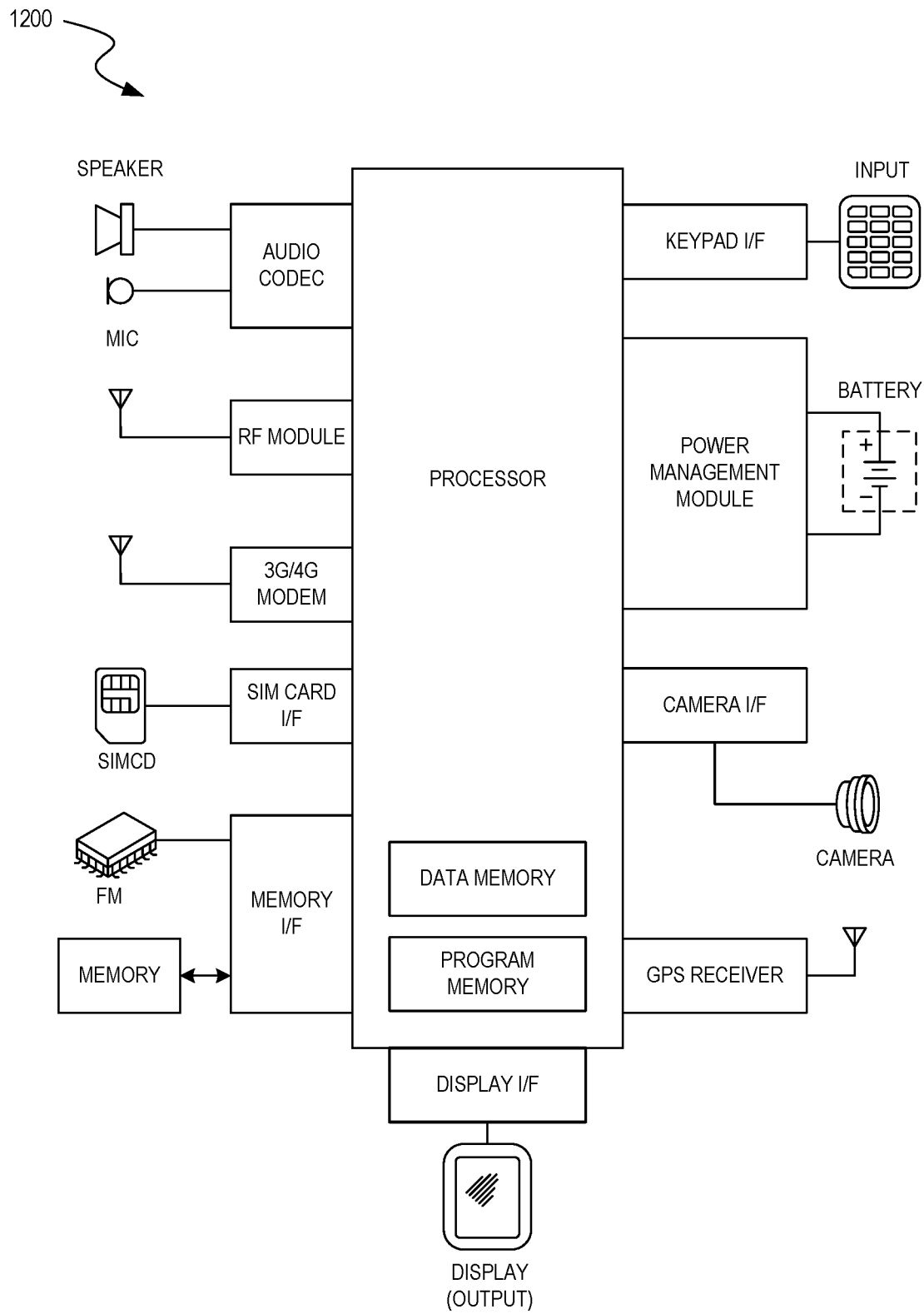
FIG. 12 is a diagrammatic representation of a machine in the example form of a computer system within which a set of instructions, for causing the machine to perform any one or more of the methodologies discussed herein, may be executed.

FIG. 12 depicts a block diagram illustrating example components of a representative client (e.g., mobile device, tablet computer, category controller, maintenance controller, etc.) 1200 in the form of a mobile (or smart) phone or tablet computer device. Various interfaces and modules are shown with reference to FIG. 12, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee™ radios and RFID transceivers, along with antennas, can populate the Printed Circuit Board.

Figure 13:
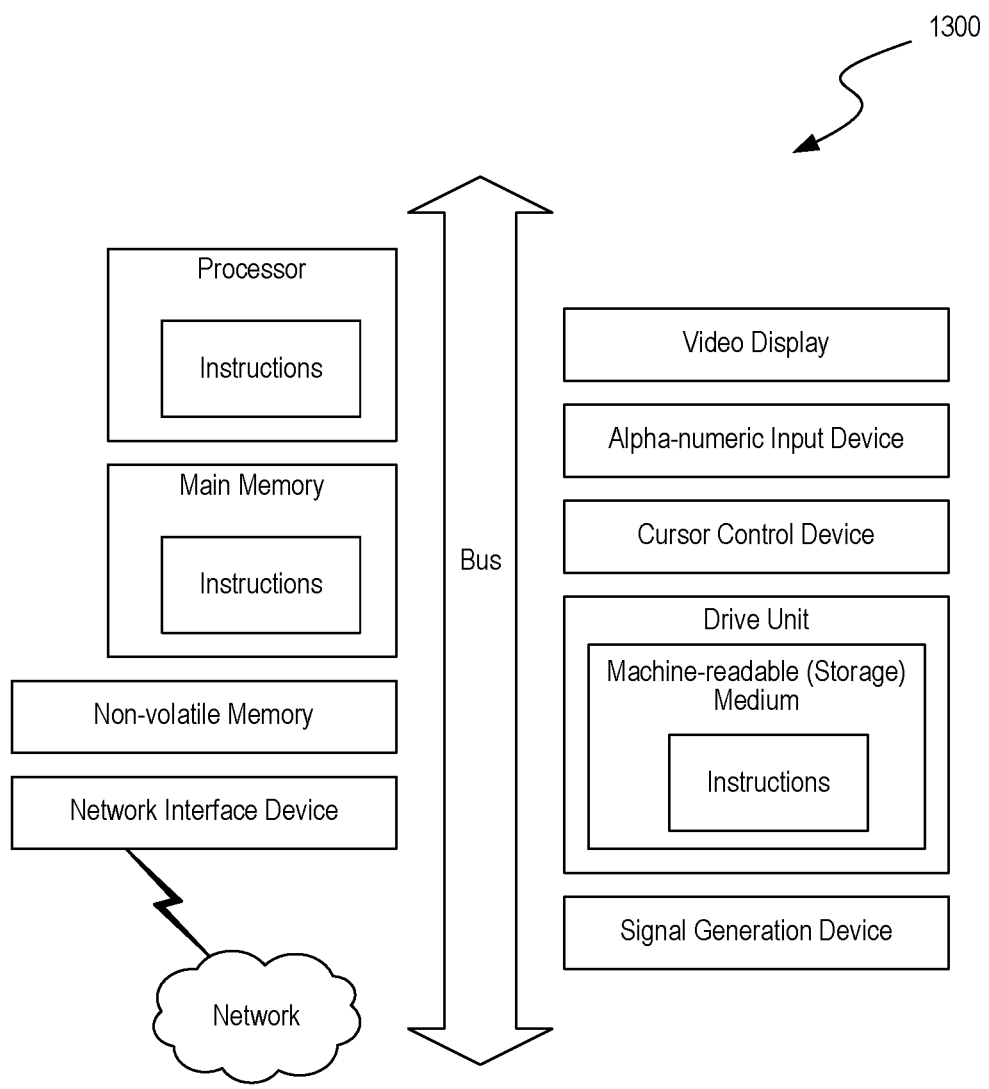
FIG. 13 is a diagrammatic representation of a machine in the example form of a computer system within which a set of instructions, for causing the machine to perform any one or more of the methodologies discussed herein, may be executed.

FIG. 13 depicts a diagrammatic representation of a machine, in the example form, of a computer system 1300 within which a set of instructions, for causing the machine to perform any one or more of the methodologies discussed herein, may be executed. The computer system 1300 can be representative of any computer system, server, etc., described herein.

In the example of FIG. 13, the computer system 1300 includes a processor (CPU), memory, non-volatile memory, and an interface device. Various common components (e.g., cache memory) are omitted for illustrative simplicity. The computer system 1300 is intended to illustrate a hardware device on which any of the components depicted in the example of FIG. 1 (and any other components described in this specification) can be implemented. The computer system 1300 can be of any applicable known or convenient type. The components of the computer system 1300 can be coupled together via a bus or through some other known or convenient device.

The processor may be, for example, a conventional microprocessor such as an Intel x86-based microprocessor. One of skill in the relevant art will recognize that the terms "machine-readable (storage) medium" or "computer-readable (storage) medium" includes any type of device that is accessible by the processor.

The memory is coupled to the processor by, for example, a bus. The memory can include, by way of example but not limitation, random access memory (RAM), such as dynamic RAM (DRAM), static RAM (SRAM), flash RAM, etc. The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 13. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a liquid crystal display (LCD), OLED, or some other applicable known or convenient display device. For simplicity, it is assumed that controllers of any devices not depicted reside in the interface.

In operation, the computer system 1300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result or output. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description herein. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment).

The machine may be a server computer, a client computer, a personal computer (PC), a tablet PC, a laptop computer, a set-top box (STB), a personal digital assistant (PDA), a cellular telephone, a smart phone a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

The invention claimed is:

1. An integrated circuit configured to receive wireless power from multiple antennas over radio-frequency transmissions, the integrated circuit comprising:
   multiple antenna ports configured to receive wireless power from two or more antennas, and configured to transmit a beacon signal to a transmitter,
      wherein the beacon signal includes a calibration signal for receiving power,
      wherein the calibration signal is used by the transmitter to generate a waveform for transmitting radio frequency (RF) power to a client device physically and electrically coupled to the integrated circuit, and
      wherein the transmitter is configured to wirelessly transmit RF power using multiple open paths from the transmitter to the client device;
   a detection unit for each of the multiple antenna ports and configured to detect received wireless power;
   a rectifying unit for each of the multiple antenna ports and configured to convert received wireless power in RF power to direct current (DC) power, and to output the DC power to an external device;
   a communication unit configured to filter data from the received wireless power;
   a beacon signal unit configured to transmit the beacon signal to the transmitter to thereby permit the transmitter to determine an identity and location of the integrated circuit,
      wherein the beacon signal unit is configured to transmit the beacon signal according to a beacon signaling schedule,
      wherein the beacon signaling schedule is partially based on a time slot when the transmitter is to send wireless RF power to the client device; and
   a control unit configured to switch the integrated circuit between filtering data, rectifying RF power, and transmitting a beacon signal,
      wherein the control unit is configured to send a predetermined voltage to a switch configured to cause at least one of the multiple antenna ports to switch from transmitting the beacon signal to receiving wireless RF power.

2. The integrated circuit of claim 1, further comprising:
   additional multiple antenna ports coupled to additional multiple antennas, wherein the two or more antennas are spaced apart from the additional multiple antennas, all of which are configured to receive wireless power;

an additional detection unit for each of the additional multiple antennas and configured to detect received wireless power; and an additional rectifying unit for each of the additional multiple antennas and configured to convert received wireless power in RF to DC power.

3. The integrated circuit of claim 1, wherein the detection unit is coupled to a central processing unit and wherein the central processing unit receives detected power level information from the detection unit and analyzes the information to determine which of the two or more antennas are receiving power.

4. The integrated circuit of claim 1, further comprising a ZigBee, IEEE 802.11 or Bluetooth communications chip electronically coupled to the communication unit.

5. The integrated circuit of claim 1, further comprising a smart phone, laptop computer, tablet computer, display device or game controller into which the integrated circuit is incorporated.

6. The integrated circuit of claim 1, further comprising:
another integrated circuit electronically coupled to the integrated circuit,
wherein the other integrated circuit is identical to the integrated circuit, and
wherein the integrated circuit and second integrated circuit are incorporated into the client device, and
wherein the client device is at least one of the following:
a smart phone, laptop computer, tablet computer, display device or game controller.

7. The integrated circuit of claim 1, further comprising:
a maximum power point (MPPT) tracking unit electronically coupled to the detection unit.

8. The integrated circuit of claim 1, wherein the multiple antenna ports, detection unit, rectifying unit, communication unit, beacon signal unit, and control unit are monolithically integrated.

9. A method for receiving wireless power at a client device, the method comprising:
at the client device, transmitting, from at least one of multiple antennas of the client device, a beacon signal,
wherein the beacon signal includes a calibration signal for receiving power at the client device,
wherein the calibration signal is used by a transmitter to generate a waveform for transmitting radio frequency (RF) power to the client device,
wherein the transmitter is configured to wirelessly transmit RF power using multiple open paths from the transmitter to the client device, and wherein the beacon signal is transmitted according to a beacon schedule, wherein the beacon schedule is partially based on a time slot when the transmitter is to send wireless RF power to the client device, and wherein the transmitter having received the beacon signal determines an identity and location of the client device; at the client device, receiving, via the multiple antennas, wireless power in a received RF power; at the client device, sending a predetermined voltage to switch at least one of the multiple antennas from receiving wireless RF power to transmitting a beacon signal; at the client device, converting the received wireless power to direct current (DC) power to power the client device; at the client device, filtering data from the received wireless power; and at the client device, sending the filtered data to a processor in the client device.

10. The method of claim 9, further comprising:
determining a first antenna of the multiple antennas is receiving more power than another antenna of the multiple antennas, and
in response to determining the first antenna is receiving more power than the second antenna, switching the second antenna to receiving communication data or stopping conversion of RF power received from the second antenna.

11. The method of claim 9, further comprising:
detecting that the client device is moving; and
in response to detecting the client device is moving, sending a notification to the transmitter to either stop transmitting power to the client device or to lower an amount of power transmitted.

12. The method of claim 9, further comprising:
detecting a received power level from each of the multiple antennas; and
sending the detected power levels to a processor physically coupled to the client device.

13. The method of claim 9, further comprising:
sending a ZigBee, IEEE 802.11, or Bluetooth communication signal to the transmitter, wherein the communication signal indicates the current power level of the client device.

14. The method of claim 9, wherein filtering further comprises:
bandpass filtering received waveforms to remove data from the waveforms; and
sending filtered waveforms to a rectifier for conversion to DC power.

15. The method of claim 9, wherein filtering further comprises:
applying a rat-race hybrid filter to the received wireless power, and
converting the filtered received wireless power to DC power.

16. An apparatus for supplying power to a client device, the apparatus comprising:
multiple antennas configured to receive wireless power, and configured to transmit a beacon signal to a transmitter,
wherein the beacon signal includes a calibration signal for receiving power,
wherein the calibration signal is used by the transmitter to generate a waveform for transmitting radio frequency (RF) power to a client device, and
wherein the transmitter is configured to wirelessly transmit RF power using multiple open paths from the transmitter to the client device;
a detection circuit for each of the multiple antennas and configured to detect power wirelessly received from the transmitter;
a rectifying circuit for each of the multiple antennas and configured to convert the received wireless RF power to direct current (DC) power;
a power storage device, coupled to the rectifying circuit, and receiving the DC power;
a communication circuit configured to filter data from the received wireless power;
a beacon signal circuit configured to transmit the beacon signal to the transmitter to thereby permit the transmitter to determine an identity and location of the client device,
wherein the beacon signal circuit is configured to transmit he beacon signal according to a beacon signaling schedule;

a switch configured to switch at least one of the multiple antennas from transmitting the beacon signal to receiving RF power,
    wherein the switch is configured to receive a predetermined voltage signal that causes the switch to switch the at least one of the multiple antennas from transmitting the beacon signal to receiving RF power; and
a processor coupled to the detection circuit and the communication circuit.

17. The apparatus of claim 16, further comprising:
additional multiple antennas, wherein the two or more antennas are spaced apart from the additional multiple antennas, all of which are configured to receive wireless power;
an additional detection circuit for each of the additional multiple antennas and configured to detect received wireless power; and
an additional rectifying unit for each of the additional multiple antennas and configured to convert received RF wireless power to DC power.

18. The apparatus of claim 16, wherein the processor receives detected power level information from the detection circuit and analyzes the information to determine which of the two or more antennas are receiving power.

19. The apparatus of claim 16, further comprising a portable housing, a display device, and user input device.

20. The apparatus of claim 16, further comprising:
a maximum power point (MPPT) tracking circuit electronically coupled to the detection unit.

* * * * *

UNITED STATES PATENT AND TRADEMARK OFFICE
CERTIFICATE OF CORRECTION

PATENT NO. : 9,620,996 B2  
APPLICATION NO. : 15/094963  
DATED : April 11, 2017  
INVENTOR(S) : Hatem Zeine et al.

It is certified that error appears in the above-identified patent and that said Letters Patent is hereby corrected as shown below:

In the Claims

Claim 16, Column 20, Line 66, delete "he" and insert --the--

Signed and Sealed this  
Thirtieth Day of May, 2017

Michelle K. Lee  
*Director of the United States Patent and Trademark Office*